United States Patent
Smith et al.

(10) Patent No.: US 10,736,285 B2
(45) Date of Patent: Aug. 11, 2020

(54) HYDROPONIC PLANT DISPLAY SYSTEM

(71) Applicant: MJNN, LLC, South San Francisco, CA (US)

(72) Inventors: Damon Henry Smith, Laramie, WY (US); Nate Mazonson, Menlo Park, CA (US); Alexandre Le Roux, Menlo Park, CA (US); Michael Flynn, Palo Alto, CA (US); Taylor Brooke Wollert, Lingle, WY (US)

(73) Assignee: MJNN, LLC, South San Francisco, CA (US)

( * ) Notice: Subject to any disclaimer, the term of this patent is extended or adjusted under 35 U.S.C. 154(b) by 426 days.

(21) Appl. No.: 15/841,433

(22) Filed: Dec. 14, 2017

(65) Prior Publication Data

US 2018/0213734 A1 Aug. 2, 2018

Related U.S. Application Data

(60) Provisional application No. 62/451,265, filed on Jan. 27, 2017, provisional application No. 62/511,134, filed on May 25, 2017.

(51) Int. Cl.
*A01G 31/06* (2006.01)
*A01G 24/00* (2018.01)

(52) U.S. Cl.
CPC ............ *A01G 31/06* (2013.01); *A01G 24/00* (2018.02); *Y02P 60/216* (2015.11)

(58) Field of Classification Search
CPC ........ A01G 31/02; A01G 31/06; A01G 9/022; A01G 9/023
See application file for complete search history.

(56) References Cited

U.S. PATENT DOCUMENTS

| | | | | |
|---|---|---|---|---|
| 1,511,632 A | * | 10/1924 | Penksa | A01G 23/14 47/53 |
| 3,452,476 A | * | 7/1969 | Kise | A01G 5/00 47/55 |
| 4,216,617 A | * | 8/1980 | Schmidt | A01G 31/06 47/62 A |
| 4,961,284 A | * | 10/1990 | Williams | A01G 9/022 47/66.5 |
| 5,363,594 A | * | 11/1994 | Davis | A01G 9/022 47/82 |
| 5,555,676 A | * | 9/1996 | Lund | A01G 9/022 47/82 |
| 8,959,834 B2 | * | 2/2015 | Hashimoto | A01G 9/025 47/63 |
| 8,966,815 B1 | * | 3/2015 | Smiles | A01G 9/022 47/39 |

(Continued)

FOREIGN PATENT DOCUMENTS

EP 0371545 A1 * 6/1990 ............ A01G 31/02

*Primary Examiner* — Magdalena Topolski
(74) *Attorney, Agent, or Firm* — Patent Law Office of David G. Beck

(57) ABSTRACT

A hydroponic plant display is that allows consumers to select and harvest fresh produce while shopping at their local market. The display system maintains the health and vitality of the produce until it is selected by the end consumer for harvesting. As such, the display system includes (i) a plant display, (ii) plant growth media that provides a suitable support system for each plant's root structure, and (iii) a moisture and nutrient transport system.

11 Claims, 20 Drawing Sheets

(56) References Cited

U.S. PATENT DOCUMENTS

| | | | | |
|---|---|---|---|---|
| 8,966,819 B1* | 3/2015 | Cosmann | ............... | A01G 9/023 |
| | | | | 47/83 |
| 9,220,207 B2* | 12/2015 | Storey | ................... | A01G 31/06 |
| 9,622,427 B2* | 4/2017 | Wagner | ................... | A01G 9/024 |
| 2003/0089037 A1* | 5/2003 | Ware | ....................... | A01G 9/025 |
| | | | | 47/83 |
| 2010/0320291 A1* | 12/2010 | Chen | ................... | A01G 27/005 |
| | | | | 239/450 |
| 2014/0130414 A1* | 5/2014 | Storey | ................... | A01G 31/06 |
| | | | | 47/62 A |
| 2015/0250114 A1* | 9/2015 | Storey | ................... | A01G 31/02 |
| | | | | 47/59 R |
| 2016/0066525 A1* | 3/2016 | Duquesnay | ............ | A01G 31/06 |
| | | | | 47/62 R |
| 2018/0014486 A1* | 1/2018 | Creechley | .............. | A01G 7/045 |
| 2019/0269080 A1* | 9/2019 | Whitworth | .............. | A01G 27/06 |
| 2020/0037525 A1* | 2/2020 | Klein | ..................... | E05F 15/60 |
| 2020/0100435 A1* | 4/2020 | Gebes | ................... | A01G 27/04 |

* cited by examiner

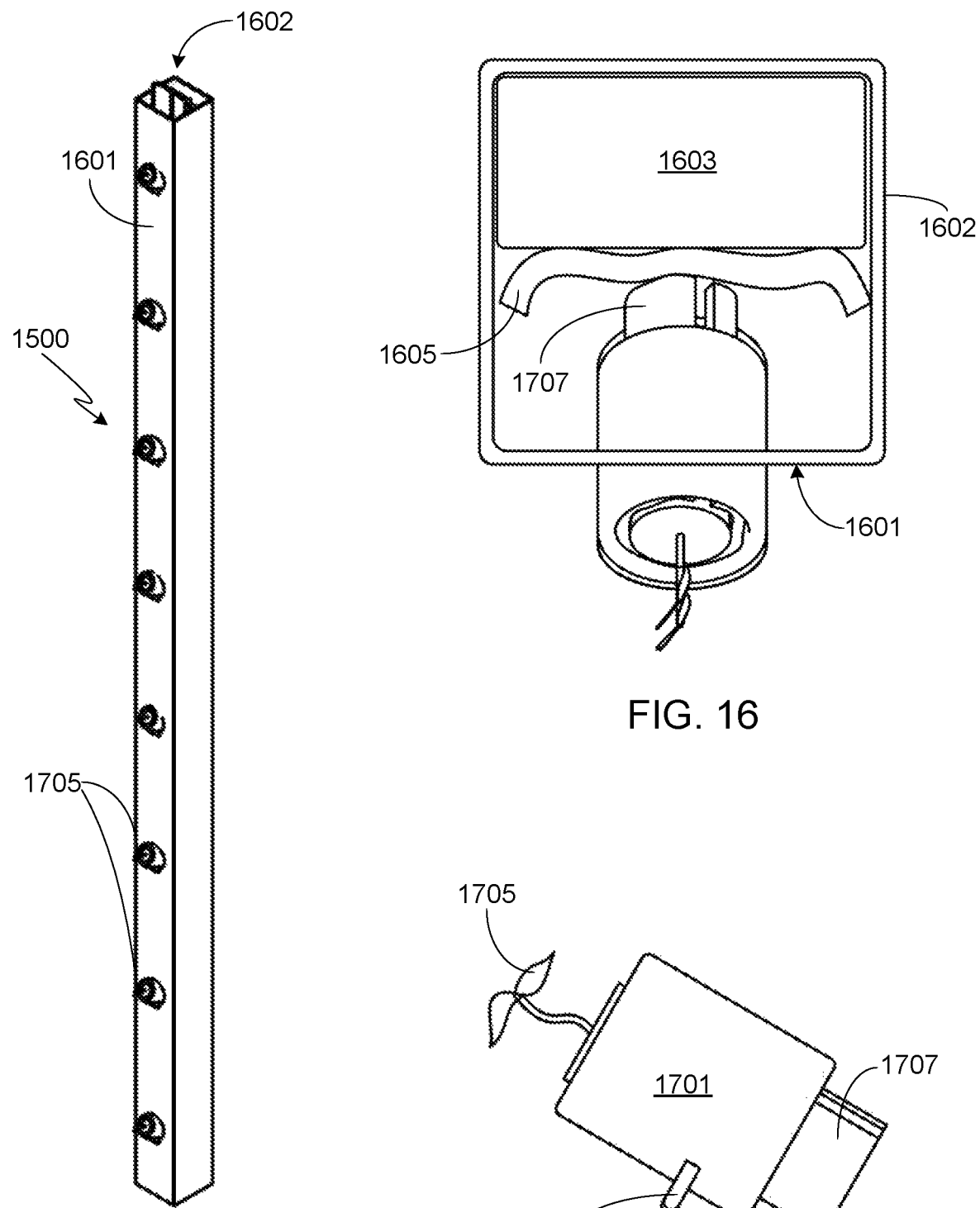

HYDROPONIC PLANT DISPLAY SYSTEM

CROSS-REFERENCE TO RELATED APPLICATION

This application claims benefit of the filing dates of U.S. Provisional Patent Application Ser. Nos. 62/451,265, filed 27 Jan. 2017, and 62/511,134, filed 25 May 2017, the disclosures of which are incorporated herein by reference for any and all purposes.

FIELD OF THE INVENTION

The present invention relates generally to hydroponic growing systems and, more particularly, to a system that displays living plants to the end consumer, thereby allowing a consumer to inspect and select a living, nutritionally-rich plant for home consumption.

BACKGROUND OF THE INVENTION

Traditionally, the agricultural produce that is displayed in supermarkets, farmer's markets, and other marketplaces must first be harvested and then transported from the farm to the store, where the distance between farm and market is typically hundreds, and sometimes thousands, of miles. As a result of the harvesting and transporting steps, the produce that ends up in the market is frequently wilted and blemished, often leading to customer dissatisfaction and potentially lost sales. Additionally, the longer the time between harvest and consumption, the greater the loss of nutrients. These problems are further exacerbated as the produce sits on the shelf waiting to be purchased.

Recognizing the nutritional value in minimizing the delay between harvest and consumption, a popular new trend is to offer locally grown produce alongside the conventionally grown produce. Unfortunately population centers and agricultural centers are frequently not located in close proximity to one another, limiting the accessibility of locally grown produce to select marketplaces. Furthermore, locally grown produce is typically only available during very limited periods of time, i.e., during the growth season for the produce in question at that particular location. Lastly, even the use of locally grown produce does not eliminate the plant damage that occurs during harvesting, nor does it completely eliminate the effects of transportation as well as the time that the produce may sit on the shelf prior to purchase. Accordingly, what is needed is a system that altogether eliminates the harvesting and transportation steps, thus maximizing the nutritional value of the plants. The present system provides such a system.

SUMMARY OF THE INVENTION

The present invention provides a hydroponic plant display system that includes at least one columnar receptacle, a plurality of plant plug casings and an irrigation system. Each columnar receptacle of the at least one columnar receptacles includes (i) a central columnar body portion, where the central columnar body portion includes a cavity that extends between the uppermost and the lowermost end regions of the central columnar body portion, and where an axis corresponding to the cavity and extending between the uppermost and the lowermost end regions of the central columnar body portion is vertical; (ii) a matrix media contained within the cavity of the central columnar body portion; and (iii) a plurality of casing receivers that are integrated into the front face of the central columnar body portion. Each plant plug casing of the plurality of plant plug casings is configured to fit within the corresponding casing receiver of the plurality of casing receivers. Additionally, each plant plug casing is configured to hold a portion of a growing medium and a plant. The irrigation system is configured to supply a water/nutrient mix to each of the plants contained in the plurality of plant plug casings. The matrix media may be comprised of a fibrous material, preferably a plastic fibrous material.

In one aspect, the system may further include a wicking medium contained within the cavity of the central columnar body portion, where the irrigation system supplies the water/nutrient mix to an upper portion of the wicking medium and the wicking medium transports the water/nutrient mix to each of the plants contained within the plurality of plant plug casings mounted within the plurality of casing receivers. Additionally, each plant plug casing may include a wicking medium strip that is in contact with the wicking medium contained with the cavity of the central columnar body portion.

In another aspect, the columnar receptacle(s) may be extruded and fabricated from a material selected from the group consisting of plastics and metals.

In another aspect, each casing receiver may be configured to extend out and away from the front face of the central columnar body portion. Each of the casing receivers may be angled upwards, preferably at an angle between 5 and 85 degrees off of the vertical axis corresponding to the columnar receptacle, and more preferably at an angle between 10 and 45 degrees off of the vertical axis corresponding to the columnar receptacle.

In another aspect, the central columnar body portion may include a plurality of barbs which are adjacent to the plurality of casing receivers. The barbs may be configured to capture an end portion of each of the plant plug casings. The barbs may be configured to sever at least a portion of the root structure corresponding to each plant contained within the plurality of plant plug casings when that plant is removed from the hydroponic plant display system. The barbs may be configured to hold the matrix media within the cavity of the central columnar body portion.

In another aspect, each plant plug casing may include one or more fasteners configured to clip onto an edge or a complimentary feature of a corresponding casing receiver.

In another aspect, each casing receiver may include an aperture formed in the front face of the central columnar body portion, where a portion of each plant plug casing is configured to fit within the aperture of the corresponding casing receiver, and where each plant plug casing further comprises an edge member that extends out and away from the portion of each plant plug casing. The edge member may be configured to locate the plant plug casing within the corresponding casing receiver.

In another aspect, each casing receiver may extend out and away from the front face of the central columnar body portion of the columnar receptacle(s), where (i) each casing receiver further includes an aperture sized to accept a portion of a corresponding plant plug casing, and (ii) each casing receiver further includes one or more slots adjacent to the aperture and sized to accept one or more complimentary casing wings of a corresponding plant plug casing. Preferably the casing wing(s) locates the plant plug casing within the corresponding casing receiver. Preferably the slot(s) are angled upwards in order to orient the corresponding plant plug casing upwards, where the angle is preferably between 5 and 85 degrees off of the vertical axis corresponding to the columnar receptacle, and more preferably between 10 and 45 degrees off of the vertical axis corresponding to the columnar receptacle.

In another aspect, each columnar receptacle may be comprised of a plurality of columnar receptacle sections, where each section includes a single casing receiver, and where a lowermost portion of each section is sized to fit within the uppermost portion of an adjacent section.

In another aspect, the system may further include a wicking medium contained within the cavity of the central columnar body portion and the irrigation system may further include a pump and a reservoir, where the pump supplies the water/nutrient mix to an upper portion of the wicking medium and the wicking medium transports the water/nutrient mix to each of the plants contained within the plurality of plant plug casings mounted within the plurality of casing receivers, and where the reservoir collects the water/nutrient mix that remains after the water/nutrient mix has been transported by the wicking medium to each of the plants.

In another aspect, the system may further include at least one light that is integrated into the display and that is configured to supply light to each of the plants contained within the plant plug casings.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 15 provides a perspective view of an alternate preferred columnar receptacle loaded with a plurality of plants;

FIG. 16 provides a cross-sectional view of the columnar receptacle shown in FIG. 15;

FIG. 17 provides a side view of a plant plug casing for use with the columnar receptacle shown in FIGS. 15 and 16;

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

In order to eliminate the plant damage and nutritional loss that occurs during harvesting and transportation from farm to market, the present invention provides a hydroponic plant display that allows consumers to select and harvest fresh produce while shopping at their local market. In accordance with the invention, the display provides means for not only displaying the produce, but also means for maintaining the health and vitality of the produce until it is selected by the end consumer for harvesting. As such, the display system includes (i) a plant display, (ii) plant growth media that provides a suitable support system for each plant's root structure, and (iii) a moisture and nutrient transport system. Depending upon the design of the display system as well as the length of time in which the plants are expected to reside within the display prior to either consumer selection or return to a non-market located hydroponic farm, the display system may further include (i) means for circulating air around the plants, and/or (ii) means for providing light to the plants.

FIGS. 1-34 illustrate various hydroponic plant displays in accordance with the invention. The illustrated variations allow a hydroponic plant display to be used in a variety of market settings, ranging from in-wall displays to free-standing displays.

Figure 1:
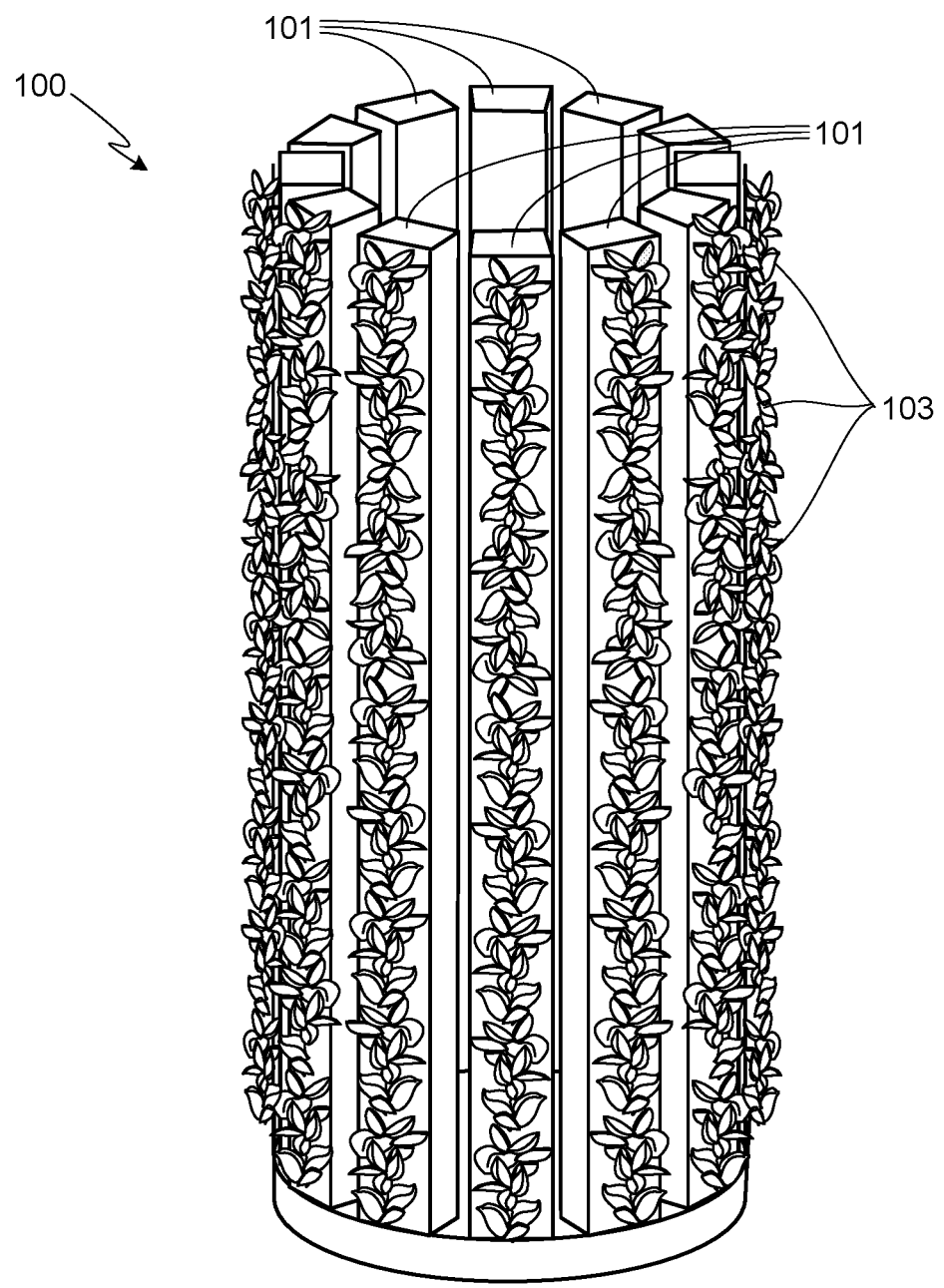
FIG. 1 illustrates a hydroponic plant display system in accordance with the invention, the illustrated display system being generally cylindrical in shape.
Figure 2:
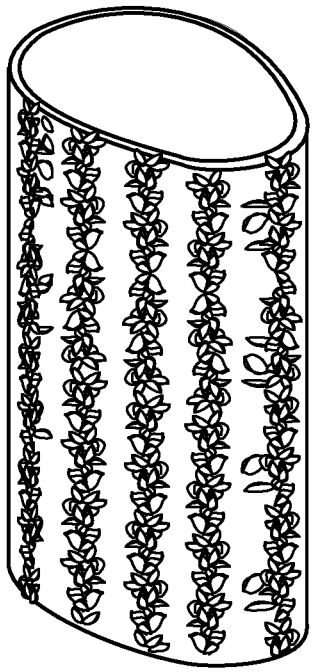
FIG. 2 illustrates an alternate configuration for the hydroponic plant display system of the invention, the illustrated display system being generally ovoid in shape.
Figure 3:
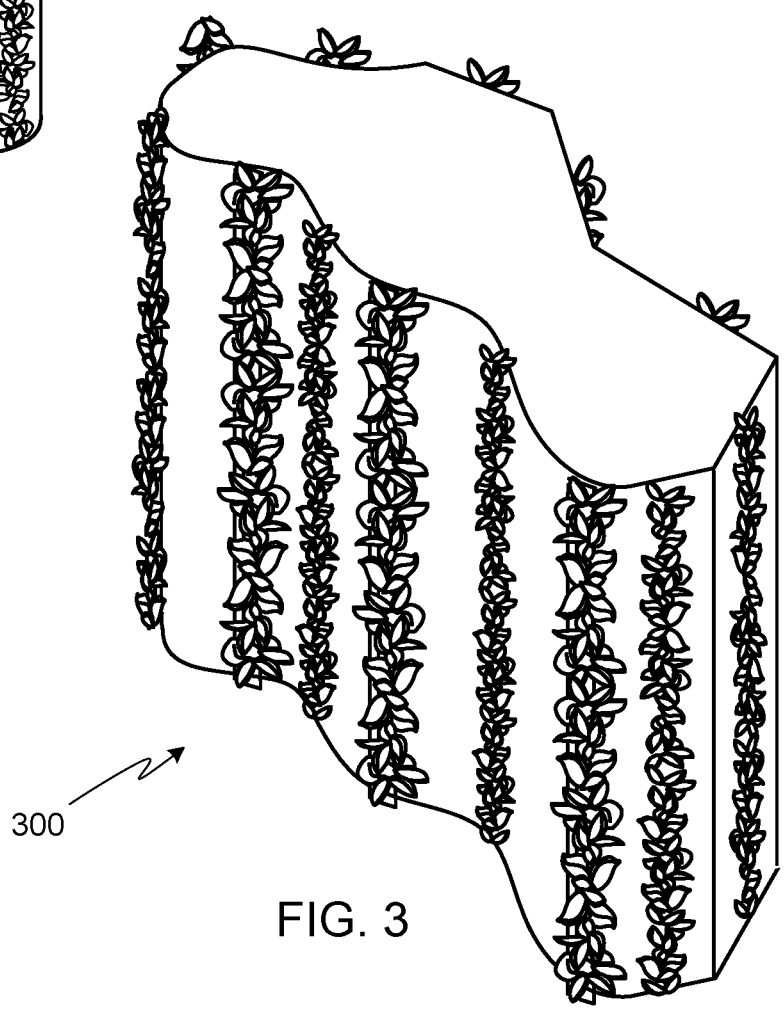
FIG. 3 illustrates an alternate configuration for the hydroponic plant display system of the invention, the illustrated display system utilizing an irregular shape.
Figure 4:
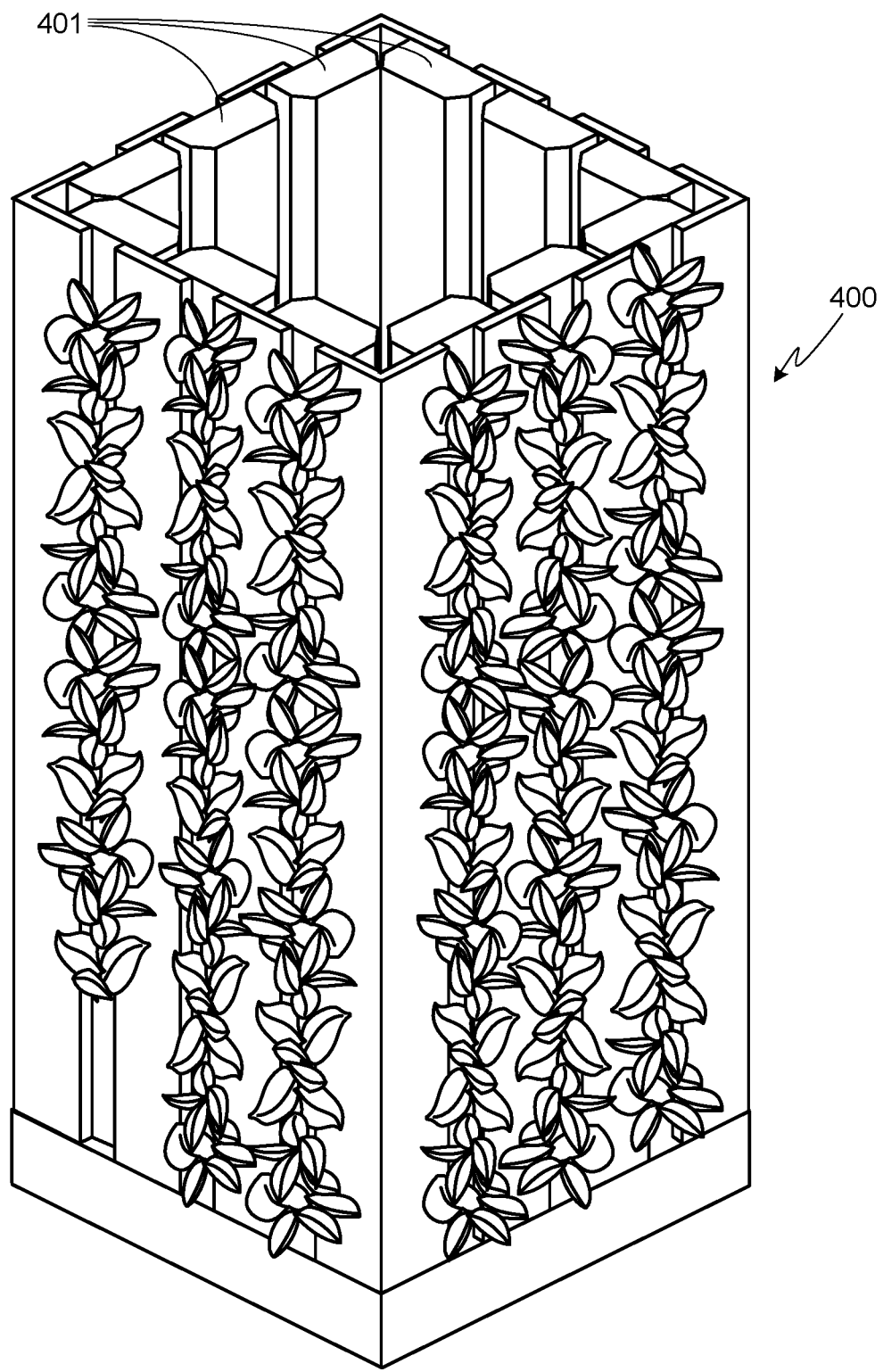
FIG. 4 illustrates an alternate configuration for the hydroponic plant display system of the invention, the illustrated display system having a generally square or rectangular cross-section and utilizing vertically oriented receptacles.
Figure 5:
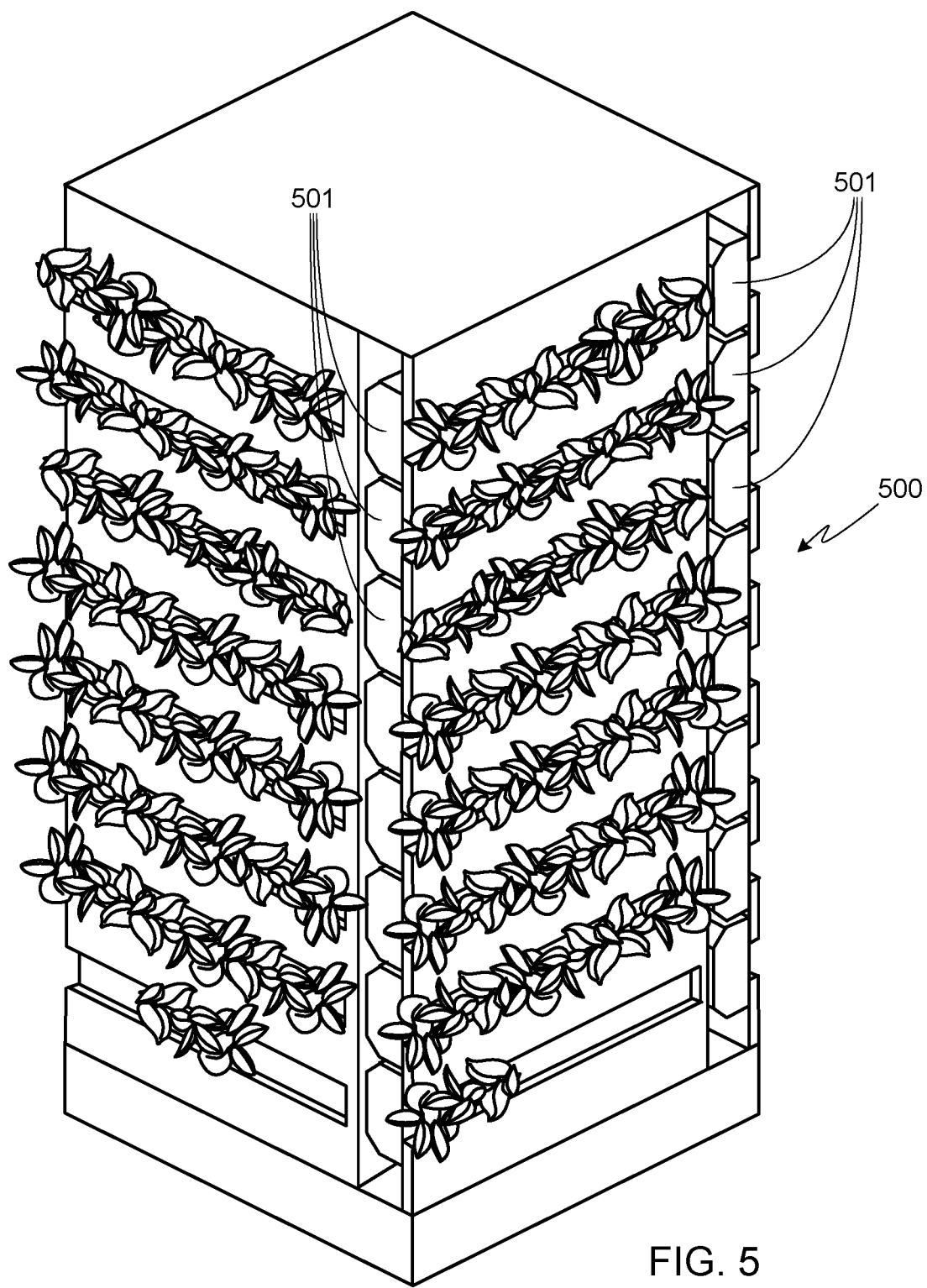
FIG. 5 illustrates an alternate configuration for the hydroponic plant display system of the invention, the illustrated display system having a generally square or rectangular cross-section and utilizing horizontally oriented receptacles.
Figure 6:
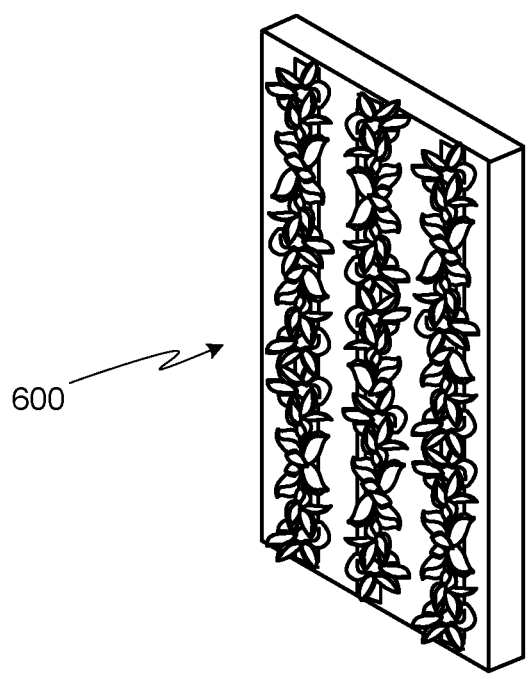
FIG. 6 illustrates an alternate configuration for the hydroponic plant display system of the invention, the illustrated display system utilizing a one-sided configuration.

Hydroponic display system 100, shown in FIG. 1, is generally cylindrical in shape. The generally cylindrical shape of display system 100 is created by combining a plurality of columnar receptacles 101, each of which is configured to hold a plurality of individual plants 103. Each plant 103 includes an intact root ball. This display configuration is ideal for situations in which it is desirable to have a display that is viewable from all sides, for example when the display is located in the center of the produce section of a market. In some instances, each columnar receptacle 101 may contain a different plant variety, thus allowing the consumer to select from a variety of live plants simply by circling the display. Alternately, display 100 may be divided into groups of columnar receptacles 101, where each group contains a different plant variety. It should be understood that a cylindrical display as shown in FIG. 1 is not the only configuration that allows viewing from all sides. For example, display system 200 shown in FIG. 2 is generally ovoid in shape; display system 300 shown in FIG. 3 utilizes an irregular shape; and display systems 400 and 500 shown in FIGS. 4 and 5, respectively, utilize a generally square or rectangular cross-section. The primary difference between display systems 400 and 500 is that in system 400 each receptacle 401 is vertically oriented while in system 500 each receptacle 501 is horizontally oriented.

While there are clear marketing advantages to a display system that allows viewing from multiple sides, it will be appreciated that such a display system may not be compatible with every market. Accordingly, the present invention is equally applicable to one-sided displays such as that shown in FIG. 6. System 600 uses columnar receptacles similar or the same as those utilized in other configurations of the invention, although the columnar receptacles are only located on one side of the display. This type of display is suitable for a wall display.

Figure 7:
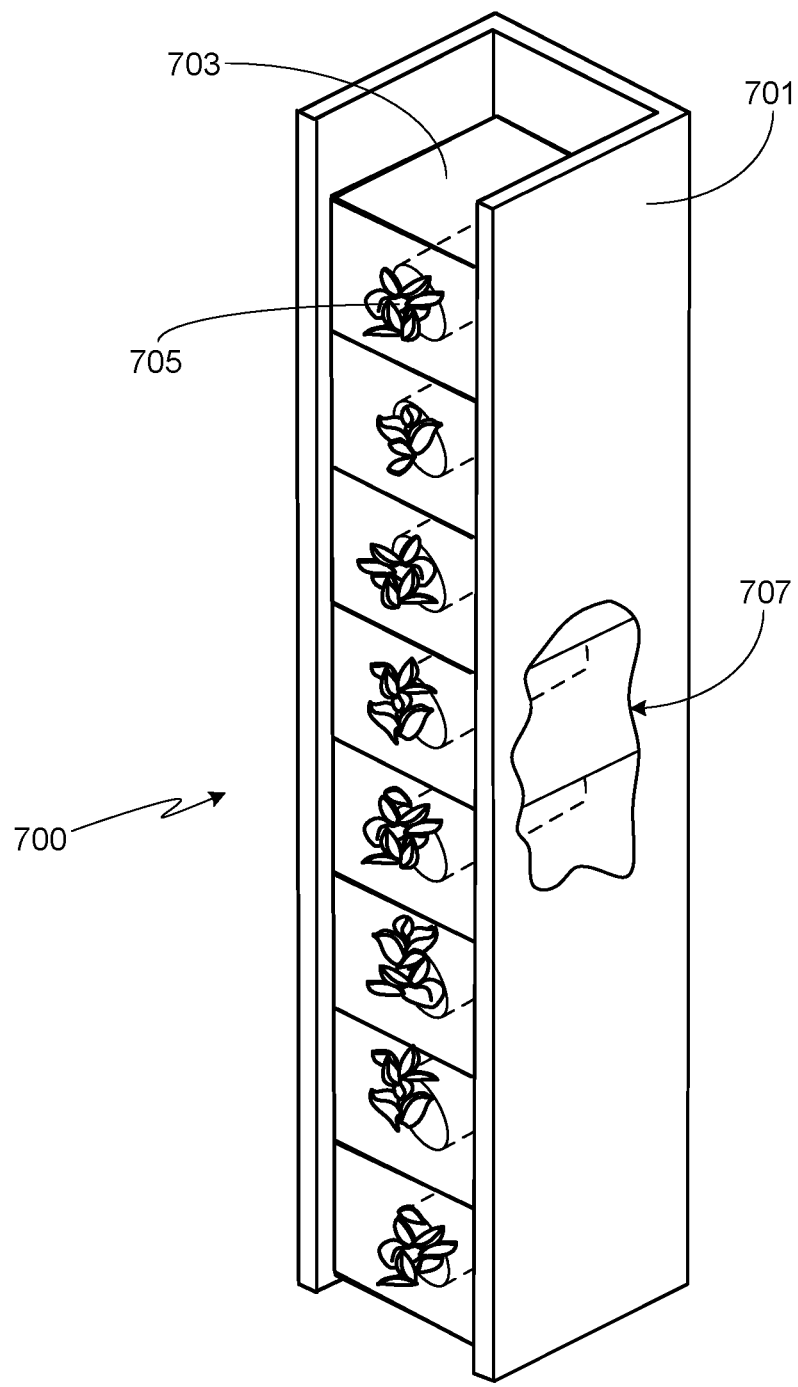
FIG. 7 illustrates one embodiment of a columnar receptacle for use in the disclosed display systems of the invention.
Figure 8:
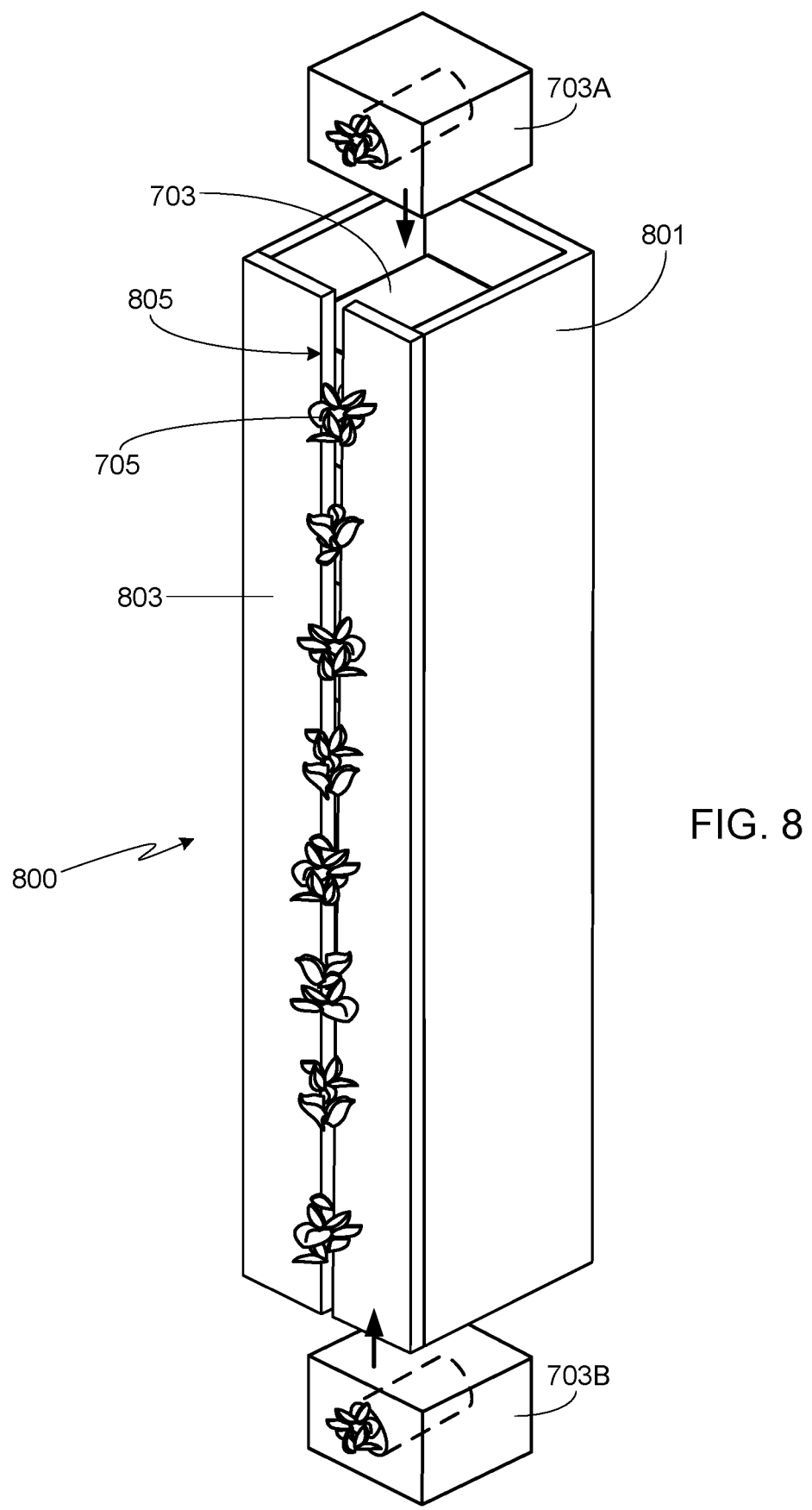
FIG. 8 illustrates a columnar receptacle similar to that shown in FIG. 7, except for the inclusion of a front panel member.
Figure 9:
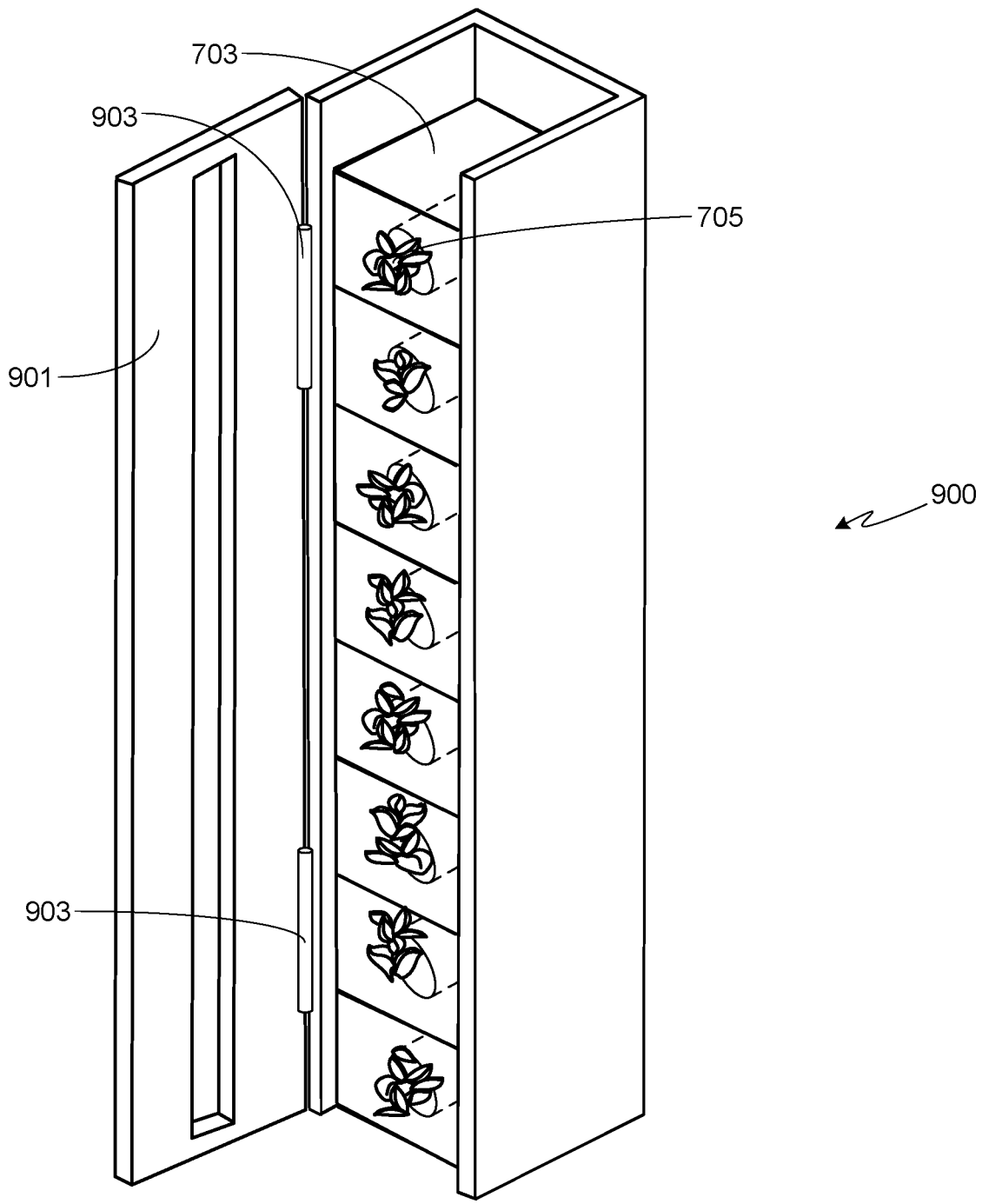
FIG. 9 illustrates a columnar receptacle similar to that shown in FIG. 7, except for the inclusion of a hinged front panel member.

Preferably the display systems configured in accordance with the invention utilize columnar plant receptacles, although in some instances the plant receptacles may be horizontally aligned as shown in system 500. FIG. 7 illustrates one embodiment of a columnar receptacle for use in the disclosed display systems of the invention. In this embodiment the columnar receptacle 701 is configured to allow plant containers 703 to be loaded into the column from the front. As shown, each container 703 includes a plant 705 along with its intact root ball. For clarity, in this illustration a transparent region 707 is shown in one wall of receptacle 701, thereby showing the underlying structures. The columnar receptacle 801 shown in FIG. 8 utilizes a design similar to that of receptacle 701 except that a front panel 803 prevents plant containers 703 from being loaded from the front. Front panel 803 includes a slot 805 or other opening that allows a consumer to view plant 705 as well as remove it from its container. In this embodiment, plant containers 703 must either be loaded from the top as exemplified by plant container 703A, or loaded from the bottom as exemplified by plant container 703B. FIG. 9 illustrates a columnar receptacle similar to that shown in FIG. 8, except that front panel 901 is hinged about hinges 903, thus allowing plant containers 703 to be loaded from the front in a manner similar to that used by system 700. Once loaded, panel 901 is closed, resulting in a columnar receptacle that looks like the one shown in FIG. 8.

Figure 10:
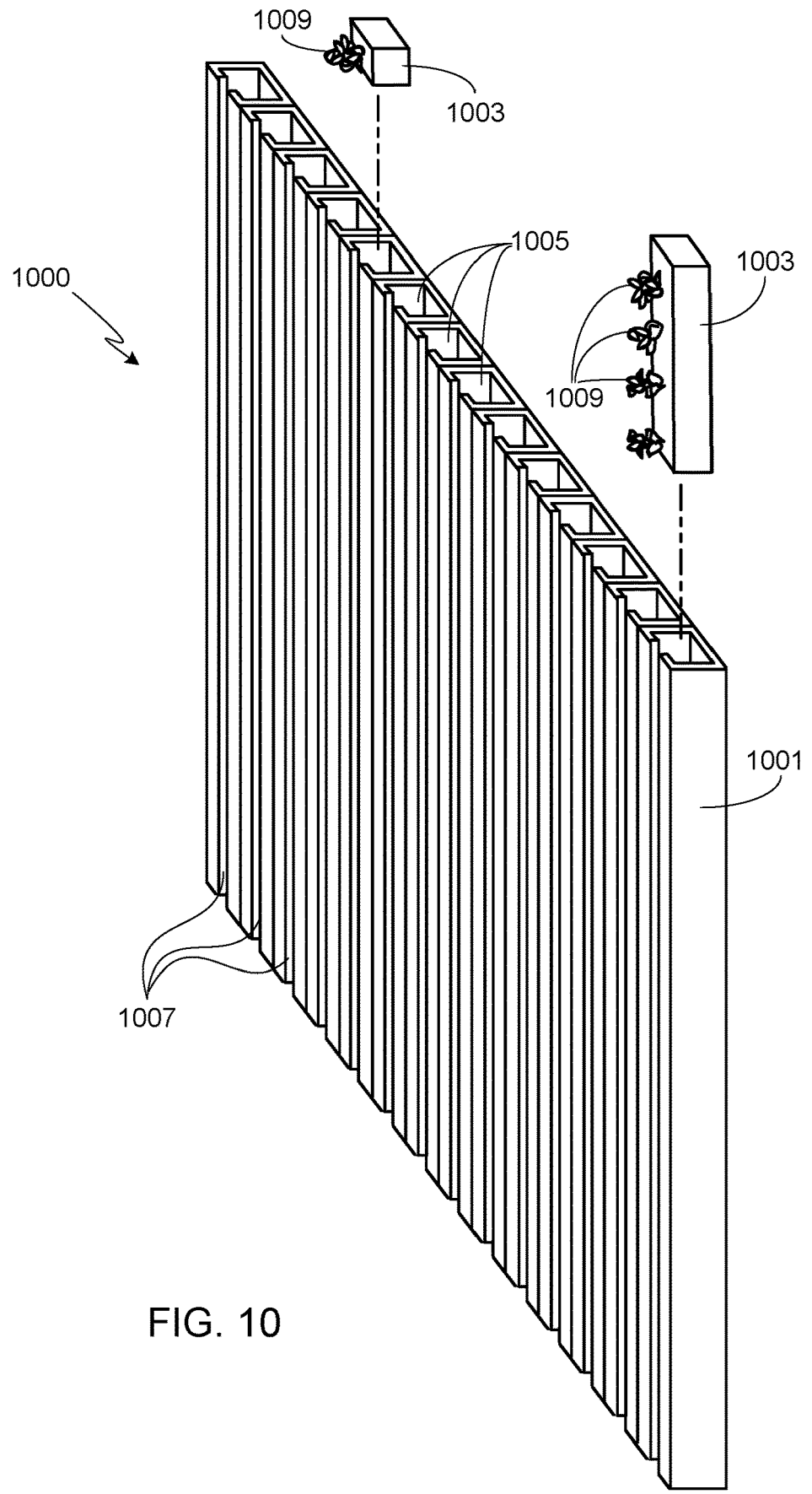
FIG. 10 illustrates an alternate configuration for the hydroponic plant display system of the invention, the illustrated display system utilizing a one-sided configuration.

Regardless of the overall shape of the hydroponic display system, preferably the plants are held in receptacles that are configured to hold multiple plants. In general the inventors have found that these receptacles are best aligned in a columnar configuration, although as noted above relative to FIG. 5, the receptacles may be aligned in horizontal rows. FIG. 10 provides further detail with respect to one configuration of the columnar receptacles. System 1000 includes a plurality of individual columnar receptacles 1001. While columnar receptacles 1001 are shown arranged in a flat panel suitable for use as a wall display, it will be appreciated that these same receptacles 1001 may be arranged in other configurations as described above and shown in FIGS. 1-9.

As shown in FIG. 10, each receptacle 1001 is hollow, thus allowing plant containers 1003 to be slid into the hollow central columnar body portion 1005 via either receptacle end. Slots 1007, located on the front face of each receptacle, allow both visual and physical access to the upper portion of each individual plant 1009, where the upper plant portion generally consists of the plant's stem and leaves and for some varietals, the plant's flower and fruit.

Figure 11:
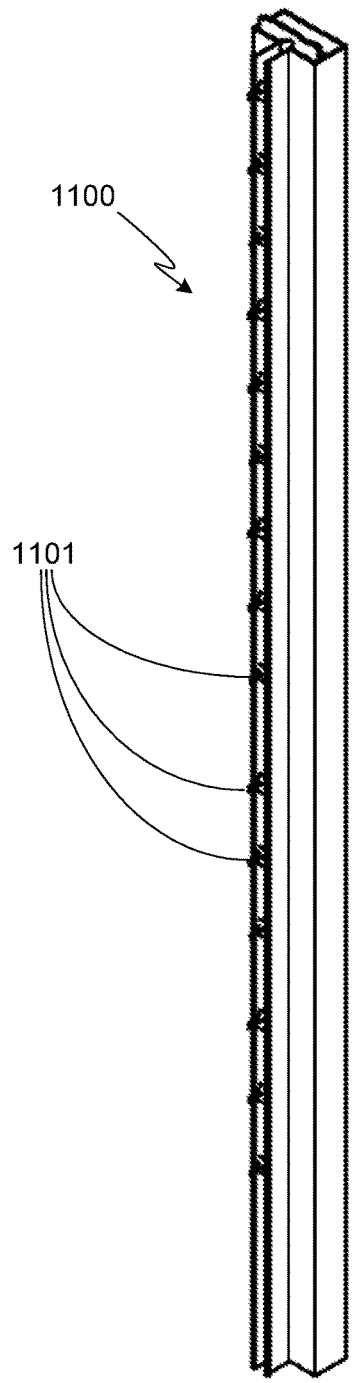
FIG. 11 provides a perspective view of a preferred columnar receptacle loaded with a plurality of plants.

FIG. 11 provides a perspective view of a preferred columnar receptacle 1100 that has been loaded with a plurality of plants 1101. Further detail of this embodiment is shown in the cross-sectional view provided in FIG. 12. Columnar receptacle 1100 is preferably extruded, although other fabrication techniques may be used in its manufacture. Preferably receptacle 1100 is fabricated from plastic (e.g., polyethylene, polypropylene, polyvinyl chloride, polytetrafluoroethylene, etc.), although it can also be made of metal (e.g., aluminum) or other material. In this embodiment a plant receiving portion 1201 extends out and away from the front face 1203 of central columnar body portion 1205. Plant receiving portion 1201 is sized to receive and retain plant plug casing 1207. As used herein, a plant plug refers to a portion of a growing medium (e.g., soil) along with a plant. The plant plug is preferably held within a casing, i.e., plant plug casing 1207, that simplifies plant handling by both the initial grower and the end consumer. Casing 1207 may be fabricated from a variety of materials, including, but not limited to, paper and/or plastic.

Each receiving portion 1201 provides a guide for the location of a corresponding plant plug casing 1207. Preferably each receiving portion 1201 is sized to hold the plug casing 1207 in place via an interference fit. Typically this interference fit is achieved by a slight compression of the plug casing during insertion into the receiving portion. Additionally, in some embodiments each receiving portion 1201 is angled slightly upwards, thereby using gravity in addition to the interference fit to maintain the plug casing in place. If angled, preferably the angle is within the range of 5 to 85 degrees off the vertical axis defined by the columnar receptacle, and more preferably within the range of 10 to 45 degrees off the vertical axis defined by the columnar receptacle.

Located within central columnar body portion 1205, and running down the length of columnar receptacle 1100, are matrix media 1209 and wicking medium 1211. Matrix media 1209 is preferably fabricated from a fibrous material, preferably composed of plastic. Wicking medium 12011, which is held in place by matrix media 1209, is used to transport moisture and nutrients along the columnar receptacle to the individual plants 1213 contained in the individual plant plug casings 1207. Each plug casing 1207 is sized to insure that the plant roots are in contact wicking medium 1211. In some configurations the end portion of each casing 1207 is in contact with wicking medium 1211. In other configurations the roots extend out the bottom of the plug casing and make direct contact with wicking medium 1211. In yet other configurations, a wicking medium 1210 extends out the end portion of the plug casing and rests against wicking medium 1211 once the plug casing is properly located within the tower.

Figure 12:
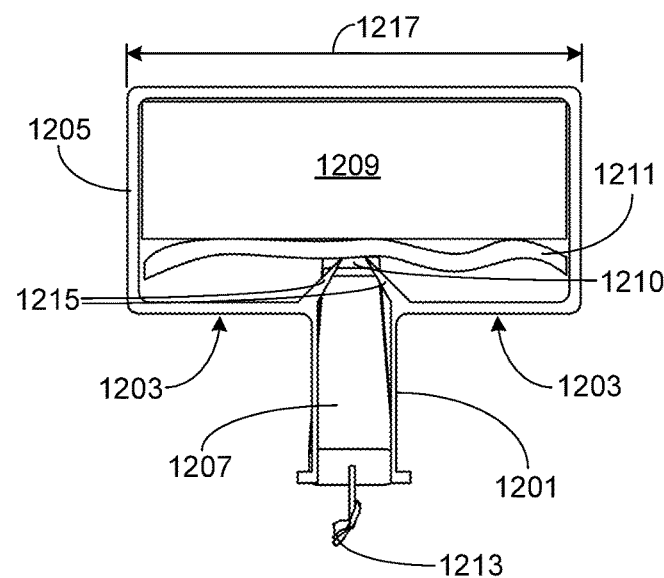
FIG. 12 provides a cross-sectional view of the columnar receptacle shown in FIG. 11.

In the embodiment illustrated in FIGS. 11 and 12, the columnar receptacle includes a pair of barbs 1215. In at least one configuration, barbs 1215 are sized to capture the end portion of plug casing 1207, thereby helping to keep the casing in place. Additionally and as shown, barbs 1215 may be sized to help keep matrix media 1209 and wicking medium 1211 in place. Lastly, during plug casing removal, barbs 1215 act as shears to sever the ends of the roots.

Figure 13:
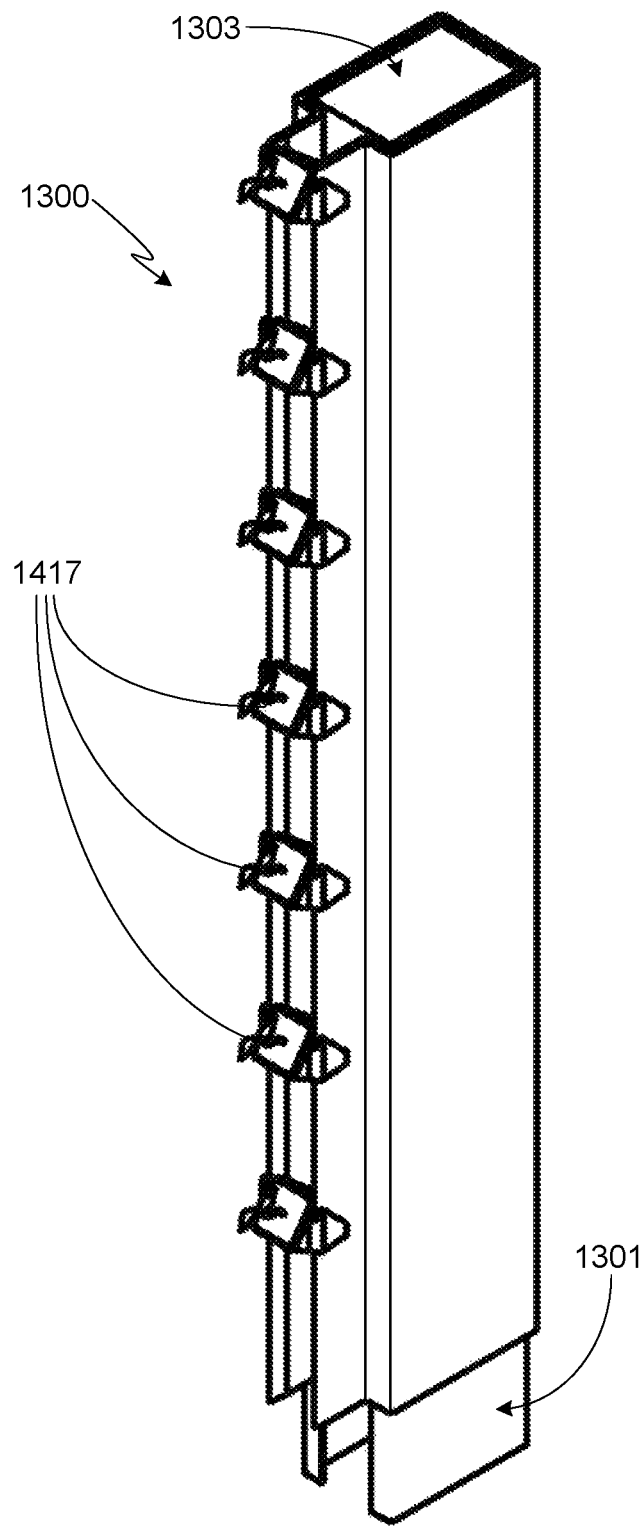
FIG. 13 provides a perspective view of an alternate preferred columnar receptacle loaded with a plurality of plants.
Figure 14:
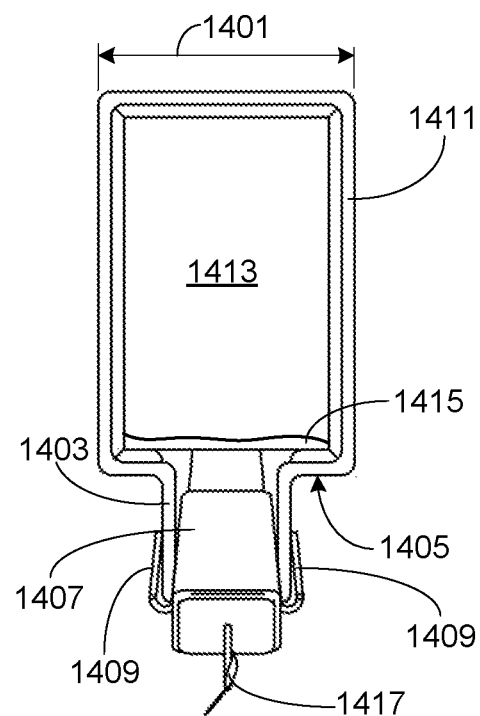
FIG. 14 provides a cross-sectional view of the columnar receptacle shown in FIG. 13.

FIGS. 13 and 14 provide perspective and cross-sectional views, respectively, of an alternate embodiment for a columnar receptacle for use with the display apparatus of the present invention. As with receptacle 1100, preferably receptacle 1300 is extruded although other manufacturing techniques may be used. Receptacle 1300 is fabricated from plastic (e.g., polyethylene, polypropylene, polyvinyl chloride, polytetrafluoroethylene, etc.), although it can also be made of metal (e.g., aluminum) or other material. This embodiment includes a feature that allows multiple columnar receptacles to be joined together, thus allowing a single design to be used for different size displays. As shown, the lower portion 1301 of the receptacle is sized to fit within the upper portion 1303 of a second receptacle (not shown).

The width 1401 of columnar receptacle 1300 is smaller than the width 1217 of receptacle 1100, thus allowing more columns to be placed in the same width display system. It will be appreciated that the width of the columnar receptacle is driven by both the space constraints of a market's display area as well as the expected size of the plants for which it is designed. Therefore while a relatively small plant would fit in a display comprised of a series of narrow columnar receptacles 1300, a plant that has considerable spread would not.

As in the prior embodiment, columnar receptacle 1300 includes a receiving portion 1403 that extends from front face 1405. Plant receiving portion 1403 is sized to receive and retain plant plug casing 1407, preferably via an interference fit. In addition to an interference fit, in this embodiment plug casing 1407 also includes one or more fastener members 1409 that are designed to clip onto receiving portion 1403, thus securely holding the plug casing in place until a consumer removes it. In this embodiment each receiving portion 1403 is angled slightly upwards as shown, where the angle is within the range of 5 to 85 degrees off the vertical axis defined by the columnar receptacle, and more preferably within the range of 10 to 45 degrees off the vertical axis defined by the columnar receptacle. Angling the plug casing helps maintain the placement of the plug casing as well as minimize water dripping off of the plants.

Located within central portion 1411, and running down the length of columnar receptacle 1300, are matrix media 1413 and wicking medium 1415. As in the prior embodiment, matrix media 1413 is preferably fabricated from a fibrous material while wicking medium 1415, which is held in place by matrix media 1413, is used to transport moisture and nutrients along the columnar receptacle to the individual plants 1417 contained in the individual plant plug casings 1407. As in the prior embodiment, the end portion of each casing 1407 may be placed in contact with wicking medium 1415, or the roots may extend out the bottom of the plug casing and be in contact with wicking medium 1415, or the casing may include a separate wicking medium that extends out the bottom of the casing and rests against wicking medium 1415 when the casing is placed within the tower.

FIGS. 15 and 16 provide perspective and cross-sectional views, respectively, of an alternate embodiment for a columnar receptacle for use with the display apparatus of the present invention. FIG. 17 provides a side view of plant plug casing 1701. While this embodiment shares many of the same features described above relative to columnar receptacles 1100 and 1300, it also demonstrates several unique features. The general design includes a columnar receptacle 1500 that may have a square cross-section as shown, or a different cross-section such as the rectangular cross-section used with tower 1100. Columnar receptacle 1500 is preferably fabricated from plastic, for example using an extrusion process, although other manufacturing processes and other materials may be used.

Columnar receptacle 1500 does not include a receiving portion that extends away from the front face. Instead, columnar receptacle includes holes on the front face 1601 of the receptacle into which corresponding plug casings 1701 fit. Preferably plug casings 1701, and the corresponding tower holes, are cylindrical as shown, although it will be appreciated that the embodiment is not limited to this shape casing. Cylindrical plug casings, however, allow the casing to be rotated within the tower, thus insuring that each plant may be optimally displayed. Preferably each plant plug casing 1701 includes an extended edge 1703 or similar feature that helps to support the casing as well as properly position the casing within the tower.

Located within central columnar body portion 1602, and running down the length of columnar receptacle 1500, are matrix media 1603 and wicking medium 1605. As in the prior embodiments, matrix media 1603 is preferably fabricated from a fibrous material while wicking medium 1605, which is held in place by matrix media 1603, is used to transport moisture and nutrients along the columnar receptacle to the individual plants 1705 contained in the individual plant plug casings 1701. In this embodiment, a wicking medium 1707 extends out of the bottom portion of casing 1701. Because wicking medium 1707 is incorporated within the plug casing, it is easy to move the casing between towers or otherwise alter its position with minimal, if any, damage to the plants roots. As shown, when the plug casing is located within the tower, the casing's wicking medium 1707 makes contact with the tower's wicking medium 1605, thereby allowing water and nutrients to reach the plant.

Figure 18:
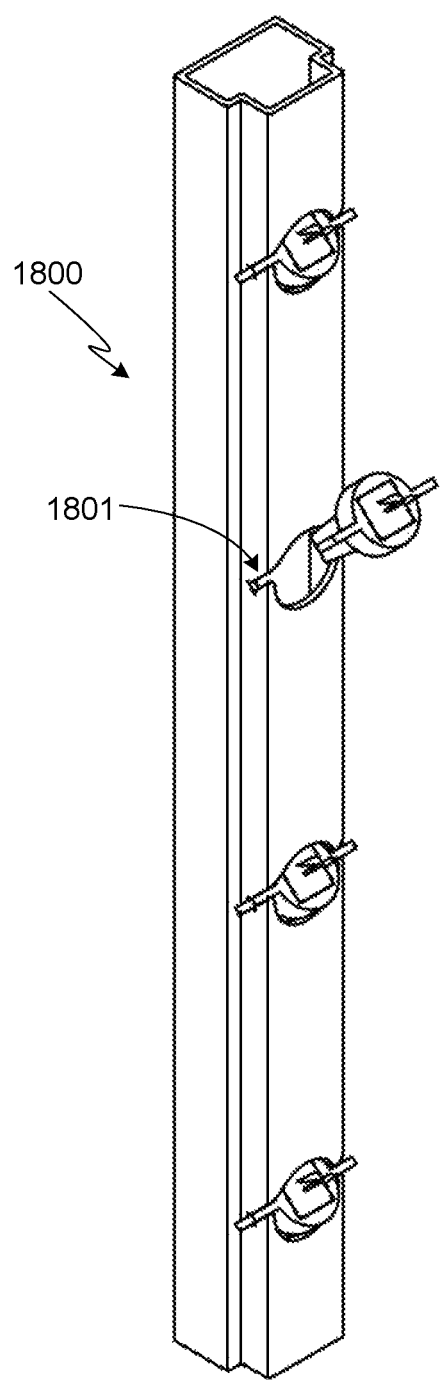
FIG. 18 provides a perspective view of an alternate preferred columnar receptacle loaded with a plurality of plants.
Figure 19:
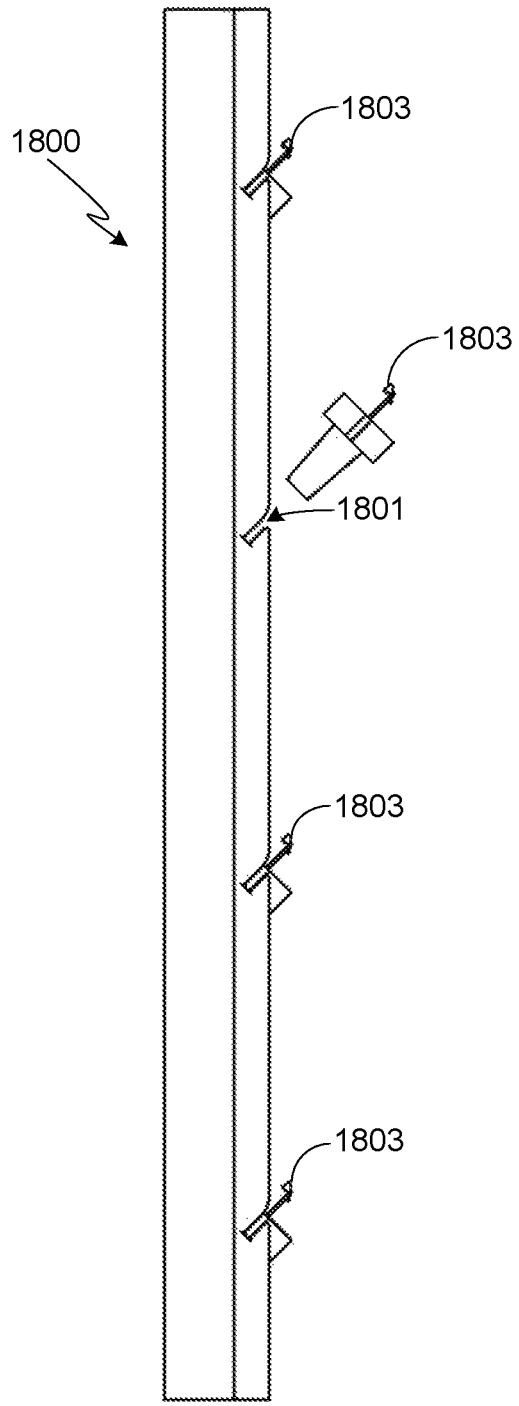
FIG. 19 provides a side view of the columnar receptacle shown in FIG. 18.
Figure 20:
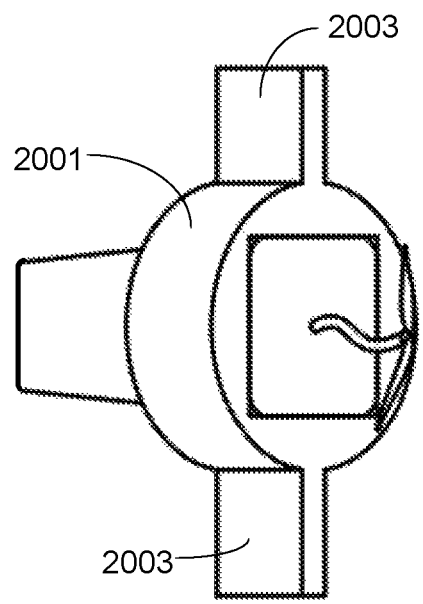
FIG. 20 provides a view of a plant plug casing for use with the columnar receptacle shown in FIGS. 18 and 19.
Figure 21:
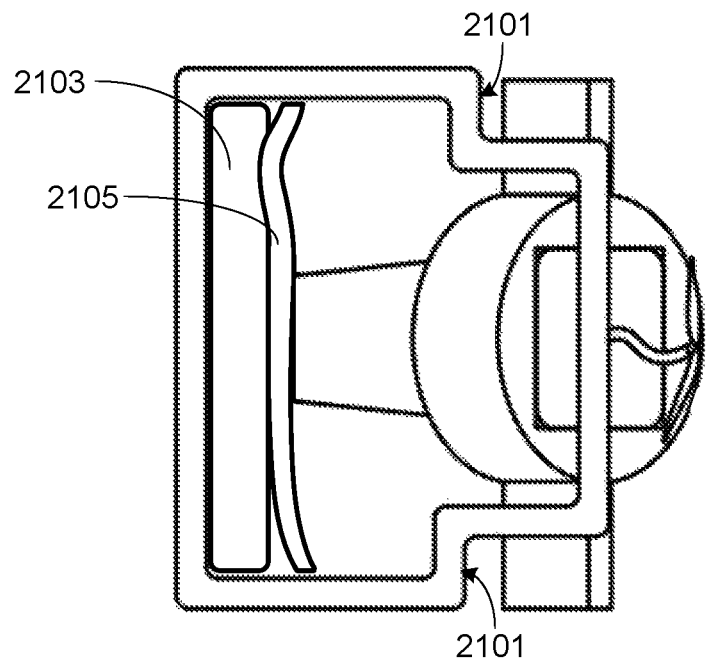
FIG. 21 provides a cross-sectional view of the columnar receptacle shown in FIGS. 18 and 19 with a plant plug casing in place.

FIGS. 18 and 19 provide perspective and side views, respectively, of an alternate embodiment for a columnar receptacle for use with the display apparatus of the present invention. FIG. 20 provides a view of plant plug casing 2001 for use with columnar receptacle 1800 while FIG. 21 provides a cross-sectional view of receptacle 1800 with plug casing 2001 in place. As in the prior embodiments, the cross-sectional shape of the tower is not limited to that shown, although the illustrated shape is preferred for the reasons described below. Columnar receptacle 1800 is preferably fabricated from plastic, for example using an extrusion process, although other manufacturing processes and other materials may be used.

Plug casing 2001 includes at least one, and preferably a pair of casing extensions 2003, also referred to herein as casing wings, that extend from the sides of the upper portion of the casing as shown. When the plant plug casing 2001 is installed in the tower, the casing wings slide into complimentary slots 1801 formed in the front portion of the tower. As such, the casing wings 2003 position casing at the desired angle within the tower as well as securely lock the casing in place within the columnar receptacle. As in the prior embodiments, the plug casing angle is preferably within the range of 5 to 85 degrees, and more preferably within the range of 10 to 45 degrees off the vertical axis as defined by the columnar receptacle. In addition to setting the angle of the plug casing, since extensions 2003 rest against the face of columnar receptacle 2101 when the casing is in place, they provide a simple means of insuring that the casing is properly seated and located in the tower. It will be appreciated that by using a pair of extensions as shown, the plug casing can be placed in two positions, thus allowing the plant to be rotated if desired, for example to improve the look of the display or to provide improved plant lighting. Note that if four extensions are used, placed around the circumference of the casing with a spacing of 90 degrees, then the plant can be rotated and placed in four positions. Other configurations are clearly envisioned by the inventors.

Preferably the plants placed in columnar receptacle 1800 are provided with water and nutrients via a wicking strip as discussed above relative to other embodiments. As such and as illustrated in the figures, towers 1800 include a matrix media 2103 and a wicking medium 2105 that run down the length of the columnar receptacle. Matrix media 2103 is preferably fabricated from a fibrous material while wicking medium 2105, which is held in place by matrix media 2103, is used to transport moisture and nutrients along the columnar receptacle to the individual plants 1803 contained in the individual plant plug casings 2001. The end portion of each casing 2001 may be placed in contact with wicking medium 2105, or the roots may extend out the bottom of the plug casing and be in contact with wicking medium 2105, or the casing may include a separate wicking medium that extends out the bottom of the casing and rests against wicking medium 2105 when the casing is placed within the tower.

Figure 22:
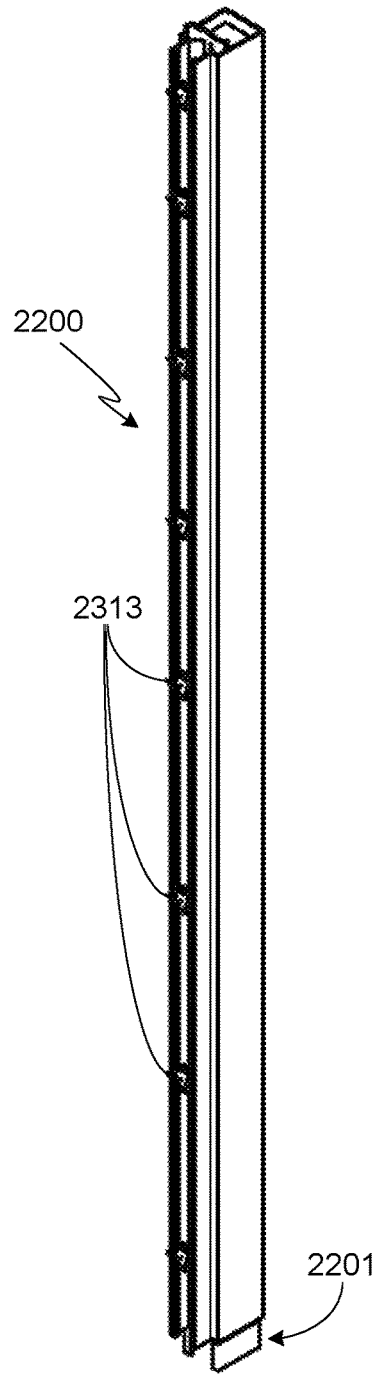
FIG. 22 provides a perspective view of an alternate preferred columnar receptacle loaded with a plurality of plants.
Figure 23:
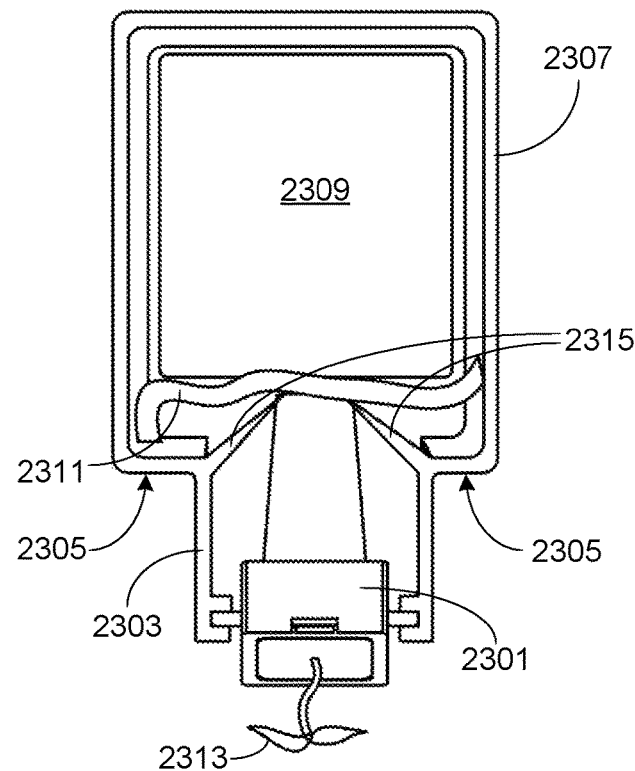
FIG. 23 provides a cross-sectional view of the columnar receptacle shown in FIG. 22.
Figure 24:
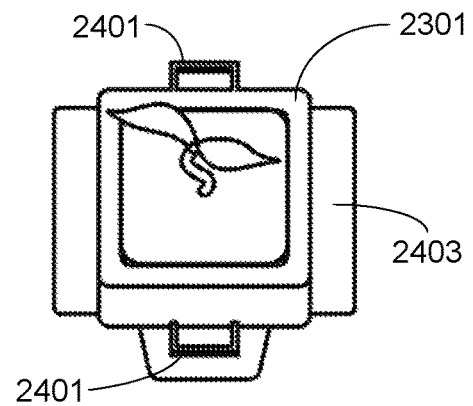
FIG. 24 provides a perspective view of a plant plug casing for use with the columnar receptacle shown in FIGS. 22 and 23.

FIGS. 22 and 23 provide perspective and cross-sectional views, respectively, of an alternate embodiment for a columnar receptacle for use with the display apparatus of the present invention. FIG. 24 provides a perspective view of plant plug casing 2301 for use with columnar receptacle 2200. This embodiment is similar to the embodiment shown in FIGS. 12 and 13 except that the main body of the tower is approximately square in cross-section, thus allowing more columns to be placed in the same width display system. Additionally, and as described further below, the plug casing includes additional locating and retention features. Columnar receptacle 2200 is preferably fabricated from plastic, for example using an extrusion process, although other manufacturing processes and other materials may be used as noted above relative to other embodiments. As shown, the lower portion 2201 of the receptacle is sized to fit within the upper portion of a second receptacle or within a complimentary feature in the display stand (not shown).

As in tower 1100, receptacle 2200 includes a casing receiver 2303 that extends from front face 2305. Casing receiver 2303 is sized to receive and retain plant plug casing 2301. Rather than relying solely on an interference fit, casing 2301 includes several loop members 2401 that are configured to capture a peg or similar complimentary feature formed in casing receiver 2303. Plug casing 2301 may also include one or more edge features 2403 that are sized to fit within a corresponding slot formed in casing receiver 2303. Thus the combination of loop members 2401 and edge features 2403 insure that the casing is correctly located within the corresponding casing receiver of the tower. Preferably each loop member 2401 fits over a complimentary snap latch or similar feature, thus preventing the casing from accidently falling out of the columnar receptacle. In this embodiment preferably each casing receiver 2303 is angled slightly upwards, where the angle is within the range of 5 to 85 degrees off, and more preferably within the range of 10 to 45 degrees off the vertical axis defined by the columnar receptacle. Angling the plug casing provides enhanced casing retention while minimizing the risk of water dripping off of the plants and onto the floor near the display.

Located within central columnar body portion 2307, and running down the length of columnar receptacle 2200, are matrix media 2309 and wicking medium 2311. Matrix media 2309 is preferably fabricated from a fibrous material. Wicking medium 2311, which is held in place by matrix media 2309, is used to transport moisture and nutrients along the columnar receptacle to the individual plants 2313 contained in the individual plant plug casings 2301. As in prior embodiments, the end portion of each casing 2301 may be placed in contact with wicking medium 2311, or the roots may extend out the bottom of the plug casing and be in contact with wicking medium 2311, or the casing may include a separate wicking medium that extends out of the bottom of the casing and rests against wicking medium 2311 when the casing is placed within the tower.

In this embodiment as in the embodiment illustrated in FIGS. 11 and 12, the columnar receptacle includes barb members 2315. Barb members 2315 are sized to help keep matrix media 2309 and wicking medium 2311 in place.

Additionally, during plug casing removal, barbs 2315 act as shears to sever the ends of the roots.

Figure 25:
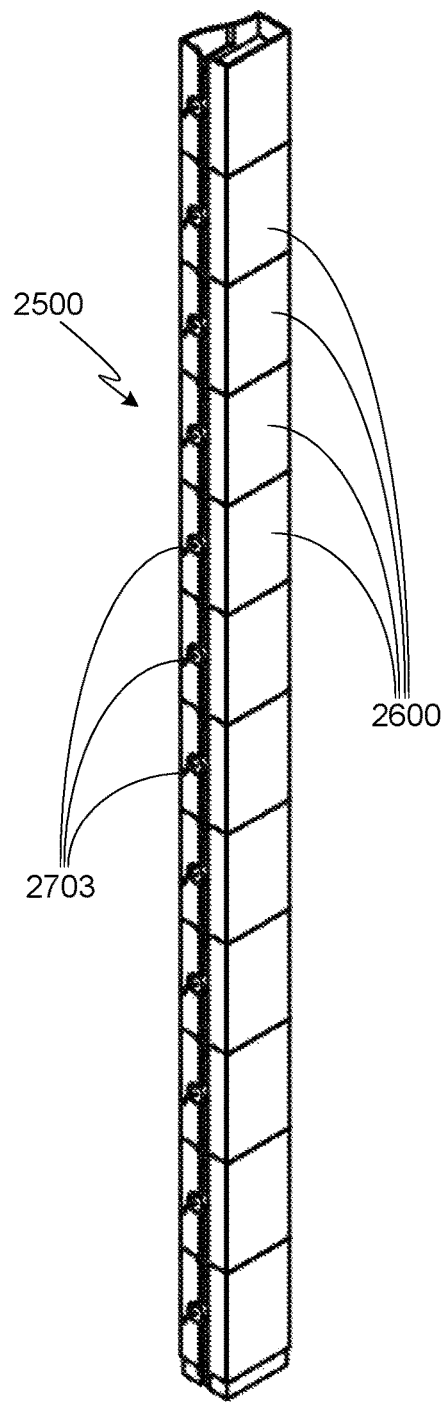
FIG. 25 provides a perspective view of an alternate preferred columnar receptacle loaded with a plurality of plants.
Figure 26:
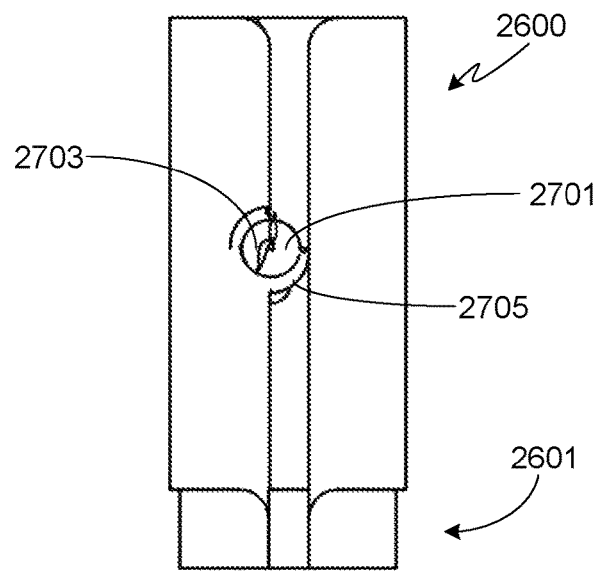
FIG. 26 provides a front view of a single module used in the columnar receptacle shown in FIG. 25.
Figure 27:
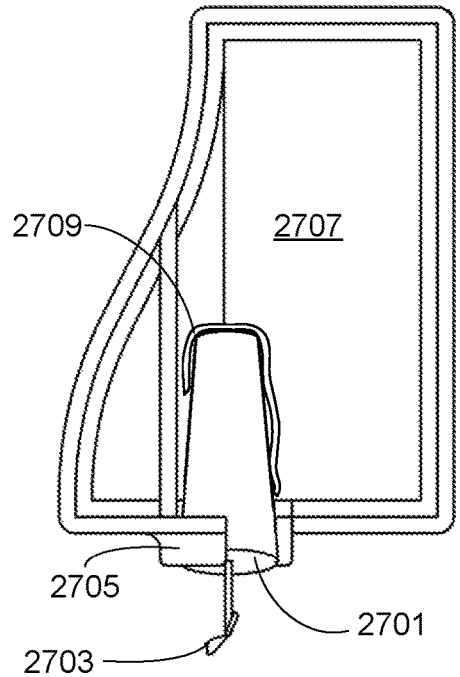
FIG. 27 provides a cross-sectional view of the columnar receptacle shown in FIG. 25.

FIG. 25 provides a perspective view of an alternate embodiment for a columnar receptacle 2500 for use with the display apparatus of the present invention. Columnar receptacle 2500 is formed from a plurality of identical modules 2600. FIG. 26 provides a front view of a single module 2600 while FIG. 27 provides a cross-sectional view of a module 2600. As shown, each module 2600 includes at least one, and preferably only one, combination plant plug 2701/plant 2703. The benefit of the module approach, which can be applied to the other tower embodiments described herein, is that the overall height of a tower can be easily adjusted to fit the requirements of a particular market's display. As a result, this particular approach is extremely versatile and cost effective. Additionally, when a particular module becomes damaged, or the material (e.g., matrix media) within a particular module becomes damaged, the module can be replaced without having to replace the entire tower. As shown, the lower portion 2601 of each module is configured to mate with a complimentary portion of an adjacent module, or a complimentary portion that is formed in the base of the display system.

In this embodiment the plant plug 2701, along with plant 2703, is placed directly into the module, i.e., a separate plug casing is not used. Each module includes an edge member 2705 that extends away from the face of the module and which provides support for plant plug 2701. Edge member 2705 is located below the plant plug in order to provide the desired level of support to the plug. If desired, edge member 2705 may extend away from the face of the module such that additional portions of the plug are supported, i.e., the sides and/or the top of the plug. In the illustrated embodiment, edge member 2705 extends from the face of the module such that three sides of the plant plug are supported.

Within each module 2600 is a matrix media 2707. Matrix media 2707 is preferably fabricated from a fibrous material, for example a fibrous material composed of plastic. Due to the compressibility of matrix media 2707, it along with edge member 2705 is sufficient to hold plant plug 2701 in place within the module. Preferably a wicking layer 2709 is positioned between the plant plug and the matrix media 2707, thus providing an efficient method of transporting water and nutrients to the plant's roots.

Preferably the embodiments of the invention utilize a wicking medium to transport water and nutrients to each of the plants contained in each columnar receptacle of the display system. The water and nutrient solution is typically introduced at the top of the wick for each columnar receptacle, and then gravity and capillary flow causes the water/nutrient mix to flow down the wick to feed each of the plants coupled to that particular wick. In order to provide a market with a stand-alone hydroponic display system, preferably a reservoir collects the water/nutrient mix at the bottom of the display system from each of the associated columnar receptacles, and then pumps that water/nutrient mix back to the top of the wicking medium contained in each of the columnar receptacles thereby providing a closed-system. In some applications, the system includes a nutrient feeder that periodically supplies additional nutrients to the water/nutrient mix, thus compensating for the loss of nutrients in the mix due to nutrients being absorbed by the plants.

Figure 28:
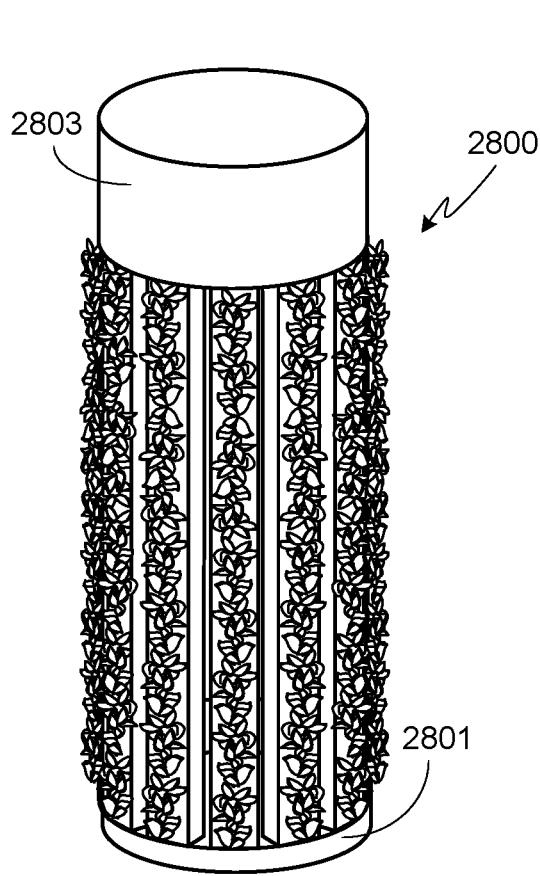
FIG. 28 illustrates a hydroponic display system in accordance with the invention in which the pump system is located at the top of the display system.
Figure 29:
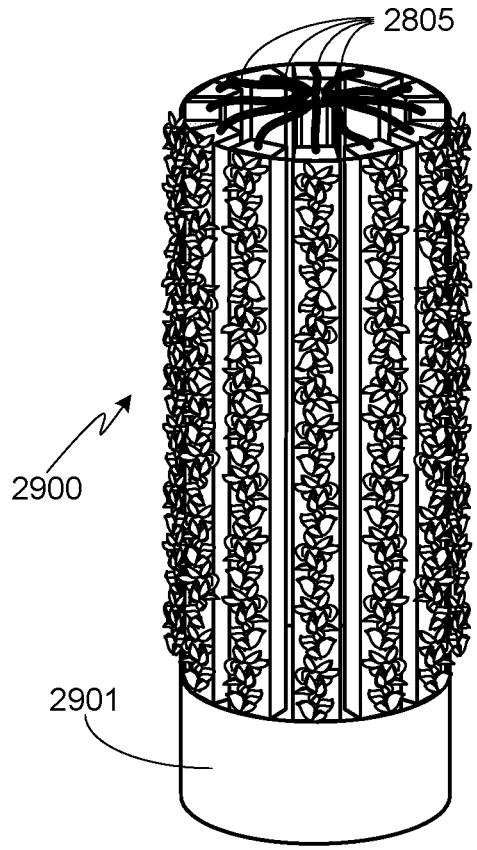
FIG. 29 illustrates a hydroponic display system in accordance with the invention in which both the reservoir and the pump are located at the bottom of the display system.
Figure 30:
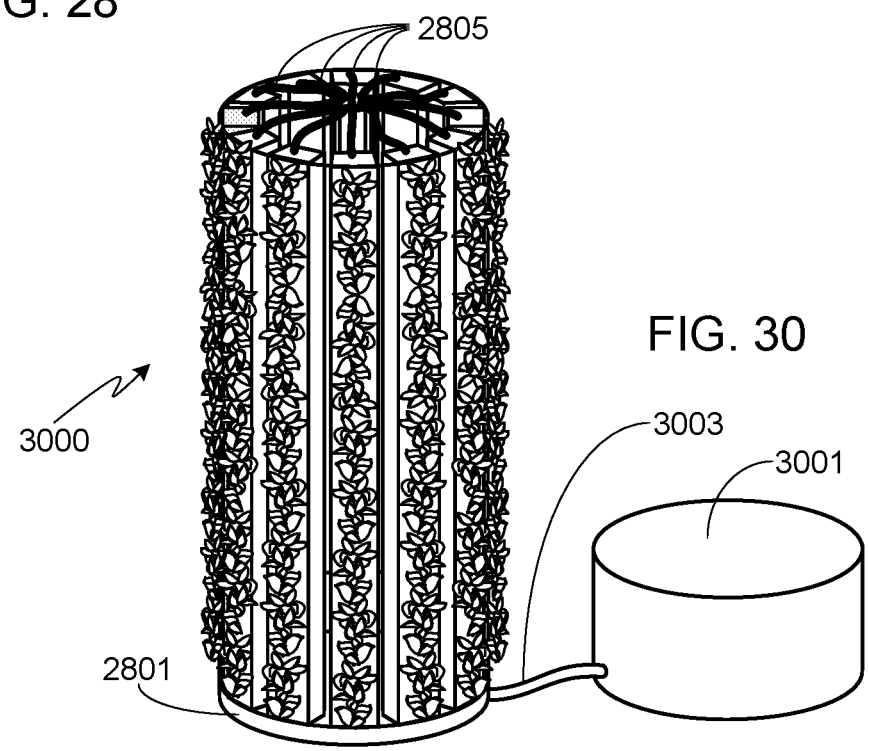
FIG. 30 illustrates a hydroponic display system in accordance with the invention in which the pump system is remotely located.

The preferred closed-system approach, which is applicable to any of the embodiments described herein that utilizes a wicking medium, is illustrated in FIGS. 28-30 based on the cylindrical display system shown in FIG. 1. In each of the illustrated exemplary systems, a reservoir 2801 is contained in the base of the display system. In display system 2800 the pump system 2803 is located at the top of the unit; in display system 2900 the pump system 2901 includes both the reservoir and the pump and is located at the bottom of the unit; and in display system 3000 the pump system 3001 is coupled to the reservoir and the display by pipes 3003, thus providing additional flexibility in system set-up by allowing the pump to be remotely positioned relative to the display unit. In the exemplary embodiments shown in FIGS. 29 and 30, the water/nutrient mix is pumped to the top of the display system and then fed via a plurality of pipes 2805 to the plurality of columnar receptacles and the respective wicking media.

Figure 31:
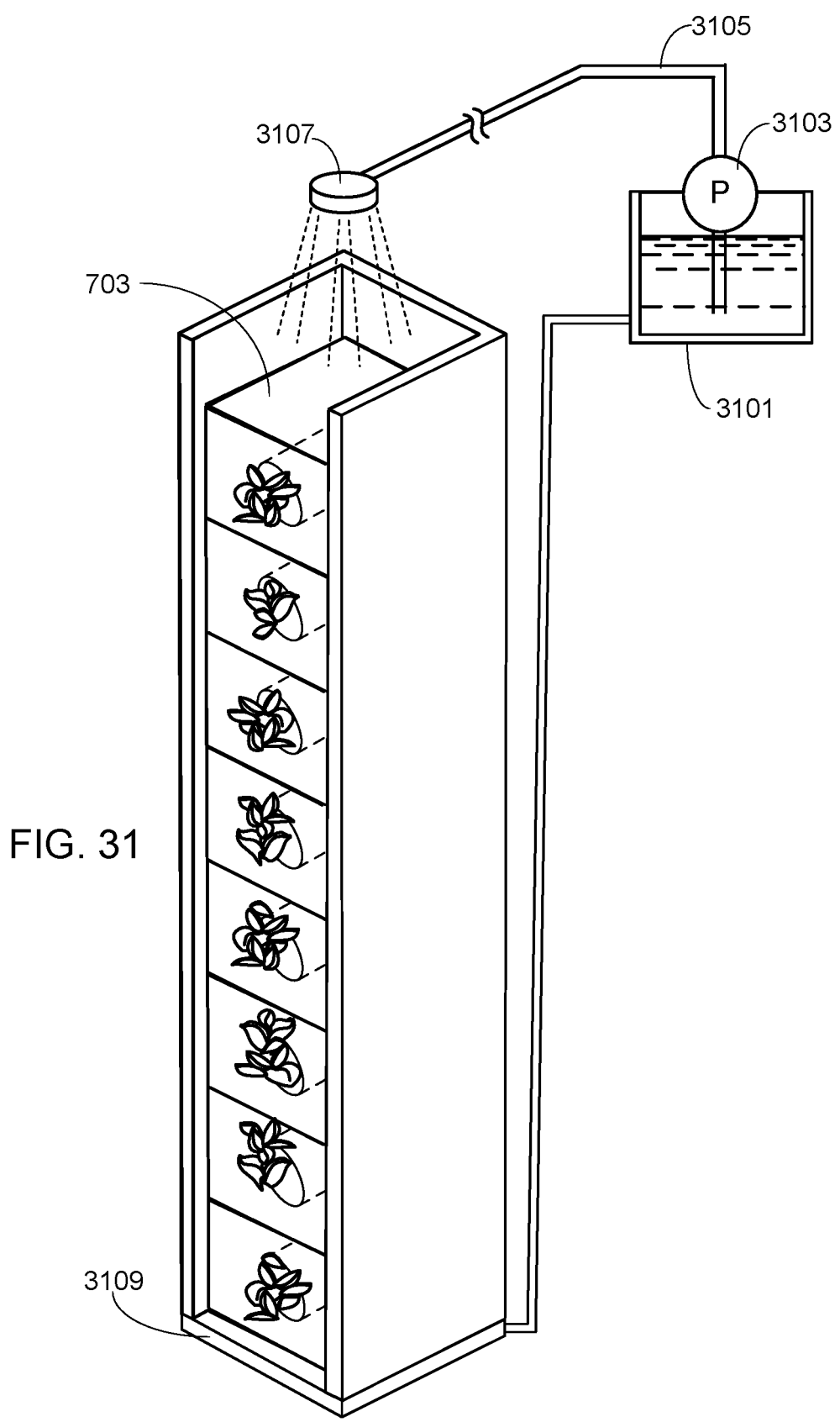
FIG. 31 illustrates an alternate water/nutrient supply system for use with the hydroponic display system of the invention.
Figure 32:
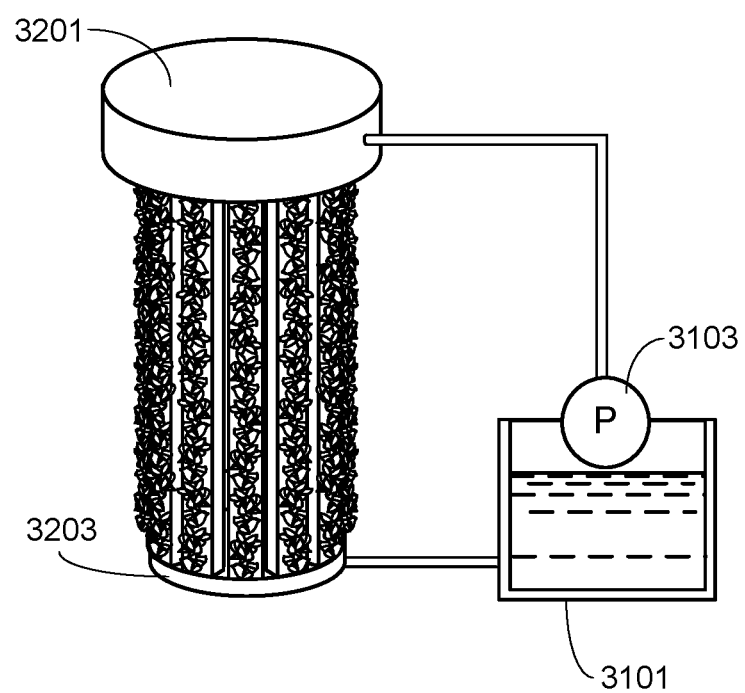
FIG. 32 illustrates an alternate water/nutrient supply system for use with the hydroponic display system of the invention.

While the wicking approach is the preferred method of supplying water and nutrients to the plants in the disclosed display system, it should be understood that other techniques may be used. For example, FIG. 31 shows an alternate water/nutrient supply system utilizing the configurations shown in FIGS. 7-9. As shown, a reservoir 3101 containing the desired mix of water and nutrients is pumped using pump 3103 through a series of pipes 3105 to water/nutrient outlet 3107. Outlet 3107 may be a nozzle, mister, or other form of outlet. The water/nutrient mix supplied by outlet 3107 may be directed to the top of the columnar receptacle as shown, after which the water/nutrient mix is allowed to seep downwardly through the stack of plant containers 703. At the bottom of the columnar receptacle is a collection reservoir 3109. The water/nutrient mix that passes through the entire stack of plant containers and is collected in reservoir 3109 is preferably returned to reservoir 3101 for re-use, although this water/nutrient mix may also be expelled out of the system via a suitable drainage system. In some embodiments, such as the exemplary embodiment shown in FIG. 32, a series of outlets are fit into an outlet module 3201 that is located at the top of the display system. These outlets then allow the water/nutrient mix pumped by pump 3103 to be directed at each columnar receptacle. As in the prior exemplary embodiment, water/nutrient mix is collected at the bottom of the display system in a reservoir 3203 for reuse.

In some applications of the invention, it is assumed that there is a relatively high turn-over in the plants contained within the display system, typically due to the plants being purchased for consumption. In such applications, the ambient illumination provided by natural lighting from nearby windows and/or artificial store lighting is sufficient to maintain plant health for a short period of time. In other applications of the invention, lights are integrated into the display thus insuring that the plants receive sufficient light both in terms of intensity and wavelength. The lights may be designed to operate continuously or on pre-determined schedules. When following pre-determined lighting schedules, the lights may be configured to only operate after the store is closed, thus insuring that consumers are not subjected to high intensity lights.

Figure 33:
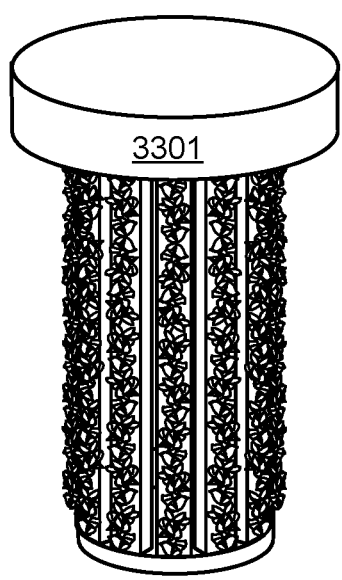
FIG. 33 illustrates a lighting system for a hydroponic display in accordance with the invention.
Figure 34:
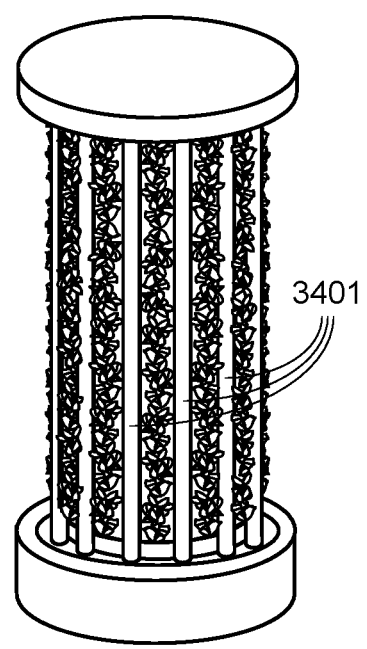
FIG. 34 illustrates an alternate lighting system for a hydroponic display in accordance with the invention.

FIGS. 33 and 34 illustrate two exemplary lighting configurations, both based on a cylindrical display system such as that shown in FIG. 1. It should be understood that these same lighting systems can be adapted for use with the other, non-cylindrical display systems disclosed herein. In FIG. 33, the lights are integrated into top member 3301 and configured such that each columnar receptacle is lit by one or more lights. The advantage of this approach is that the lights are directed at the plants, and not directed outwards into the market where they are easily viewed by consumers or people walking by the display. In the configuration illustrated in FIG. 34, rows of lights 3401 are interposed between adjacent columnar receptacles. The advantage of this approach is that all of the plants, from the uppermost plants to the lowermost plants in each columnar receptacle, are insured of receiving sufficient light.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A hydroponic plant display system, comprising:
   at least one columnar receptacle, each columnar receptacle of said at least one columnar receptacle comprising:
      a central columnar body portion, said central columnar body portion comprising a cavity, said cavity extending between an uppermost end region of said central columnar body portion and a lowermost end region of said central columnar body portion, and wherein an axis corresponding to said cavity and extending between said uppermost end region and said lowermost end region is vertical, said central columnar body portion including a plurality of barbs;
      a matrix media contained within said cavity of said central columnar body portion;
      a plurality of casing receivers, said plurality of casing receivers integrated into a front face of said central columnar body portion of each columnar receptacle of said at least one columnar receptacle, wherein said plurality of barbs are adjacent to said plurality of casing receivers;
   a plurality of plant plug casings, each of said plurality of plant plug casings configured to fit within a corresponding casing receiver of said plurality of casing receivers, and each of said plurality of plant plug casings configured to hold a portion of a growing medium and a plant, wherein said plurality of barbs are configured to capture an end portion of each plant plug casing of said plurality of plant plug casings, and wherein said plurality of barbs are configured to sever at least a portion of a root structure corresponding to each plant contained within said plurality of plant plug casings when said plant is removed from said hydroponic plant display system; and
   an irrigation system configured to supply a water/nutrient mix to each of said plants contained within said plurality of plant plug casings mounted within said plurality of casing receivers of said at least one columnar receptacle.

2. The hydroponic plant display system of claim 1, said irrigation system further comprising a wicking medium, said wicking medium contained within said cavity of said central columnar body portion of each columnar receptacle of said at least one columnar receptacle, said irrigation system configured to supply said water/nutrient mix to an upper portion of said wicking medium, and said wicking medium configured to transport said water/nutrient mix to each of said plants contained within said plurality of plant plug casings mounted within said plurality of casing receivers of said at least one columnar receptacle.

3. The hydroponic plant display system of claim 2, wherein each plant plug casing of said plurality of plant plug casings includes a wicking medium strip, and wherein said wicking medium strip is in contact with said wicking medium contained within said cavity of said central columnar body portion when said plant plug casing is located within said corresponding casing receiver.

4. The hydroponic plant display system of claim 1, wherein said at least one columnar receptacle is extruded, and wherein said at least one columnar receptacle is fabricated from a material selected from the group consisting of plastics and metals.

5. The hydroponic plant display system of claim 1, wherein each casing receiver of said plurality of casing receivers extends out and away from said front face of said central columnar body portion of said at least one columnar receptacle.

6. The hydroponic plant display system of claim 1, wherein each casing receiver of said plurality of casing receivers is angled upwards at an angle between 5 and 85 degrees off of said axis.

7. The hydroponic plant display system of claim 6, wherein each casing receiver of said plurality of casing receivers is angled upwards at an angle between 10 and 45 degrees off of said axis.

8. The hydroponic plant display system of claim 1, said matrix media comprised of a fibrous material composed of plastic.

9. The hydroponic plant display system of claim 1, said plurality of barbs configured to hold said matrix media within said cavity of said central columnar body portion.

10. The hydroponic plant display system of claim 1, said irrigation system further comprising a wicking medium, said wicking medium contained within said cavity of said central columnar body portion of each columnar receptacle of said at least one columnar receptacle, said irrigation system further comprising a pump configured to supply said water/nutrient mix to an upper portion of said wicking medium, said wicking medium configured to transport said water/nutrient mix to each of said plants contained within said plurality of plant plug casings mounted within said plurality of casing receivers of said at least one columnar receptacle, said hydroponic plant display further comprising a reservoir configured to collect said water/nutrient mix remaining after said wicking medium transports said water/nutrient mix to each of said plants.

11. The hydroponic plant display system of claim 1, further comprising at least one light integrated into said hydroponic plant display system and configured to supply light to each plant contained within said plurality of plant plug casings.

* * * * *